(12) United States Patent
Yamaguchi et al.

(10) Patent No.: US 8,175,323 B2
(45) Date of Patent: May 8, 2012

(54) IMAGE PROCESSING METHOD AND IMAGE PROCESSING APPARATUS

(75) Inventors: Takashi Yamaguchi, Kawasaki (JP); Takeo Miki, Machida (JP); Kenji Miyazaki, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 938 days.

(21) Appl. No.: 12/190,798

(22) Filed: Aug. 13, 2008

(65) Prior Publication Data

US 2009/0092280 A1 Apr. 9, 2009

(30) Foreign Application Priority Data

Aug. 17, 2007 (JP) .................................. 2007-212840
Feb. 19, 2008 (JP) .................................. 2008-037896

(51) Int. Cl.
*G06K 9/00* (2006.01)
(52) U.S. Cl. ........................................ 382/100; 382/162
(58) Field of Classification Search .................... 382/100
See application file for complete search history.

(56) References Cited

U.S. PATENT DOCUMENTS

| | | | | |
|---|---|---|---|---|
| 6,591,009 | B1 * | 7/2003 | Usami et al. .................. | 382/165 |
| 6,741,758 | B2 * | 5/2004 | Hayashi et al. ............... | 382/294 |
| 6,750,983 | B1 * | 6/2004 | Miyake ........................... | 358/1.9 |
| 6,763,124 | B2 * | 7/2004 | Alattar et al. .................. | 382/100 |
| 2005/0157149 | A1 | 7/2005 | Yamaguchi et al. | |

FOREIGN PATENT DOCUMENTS

| | | | |
|---|---|---|---|
| EP | 0 921 675 | A2 | 6/1999 |
| EP | 1 136 947 | A2 | 9/2001 |
| EP | 1 385 121 | A1 | 1/2004 |
| JP | 2001-268346 | | 9/2001 |
| JP | 3547892 | | 7/2004 |
| JP | 2005-184603 | | 7/2005 |
| JP | 2007-060527 | | 3/2007 |

OTHER PUBLICATIONS

European Search Report dated Dec. 4, 2008 for Appln. No. 08014507.1-2218.
Fleet et al.; "Embedding Invisible Information in Color Images"; Image Processing, 1997, Proceedings, International Conference on Santa Barbara, Ca.; Oct. 26-29,1997; IEEE Comput; vol. I, Oct. 26, 1997 pp. 532-535, XP 010254225; ISBN: 978-0-8186-8183-7.
European Search Report dated Dec. 18, 2009 for Appln. No. 09175245.1-2218.
Nakashizu, Makoto et al.; "Data Embedding in Binary Images by Block Error Diffusion Method"; Tokyo University of Agriculture and Technology; Journal of IIEEJ; vol. 31, No. 4 (2002).
Japanese Office Action dated Oct. 4, 2011.

* cited by examiner

*Primary Examiner* — Tom Y Lu
(74) *Attorney, Agent, or Firm* — Pillsbury Winthrop Shaw Pittman, LLP

(57) ABSTRACT

In an image processing apparatus for creating synthetic image information by embedding sub-information in an invisible state in main image information in a visible state, attention pixels in the main image information are set, a specific pixel block is created by assigning a first specific pixel to the attention pixel of a first color and a second specific pixel to the attention pixel of a second color, first key information is selected for a first value of the sub-information constituted by binary information and second key information is selected for a second value, color difference modulation processing is performed on the selected key information based on a predetermined color difference amount, and the color-difference-modulated key information is superposed on the specific pixel block to thereby create the synthetic image information in which the sub-information in an invisible state is embedded in the main image information.

15 Claims, 21 Drawing Sheets

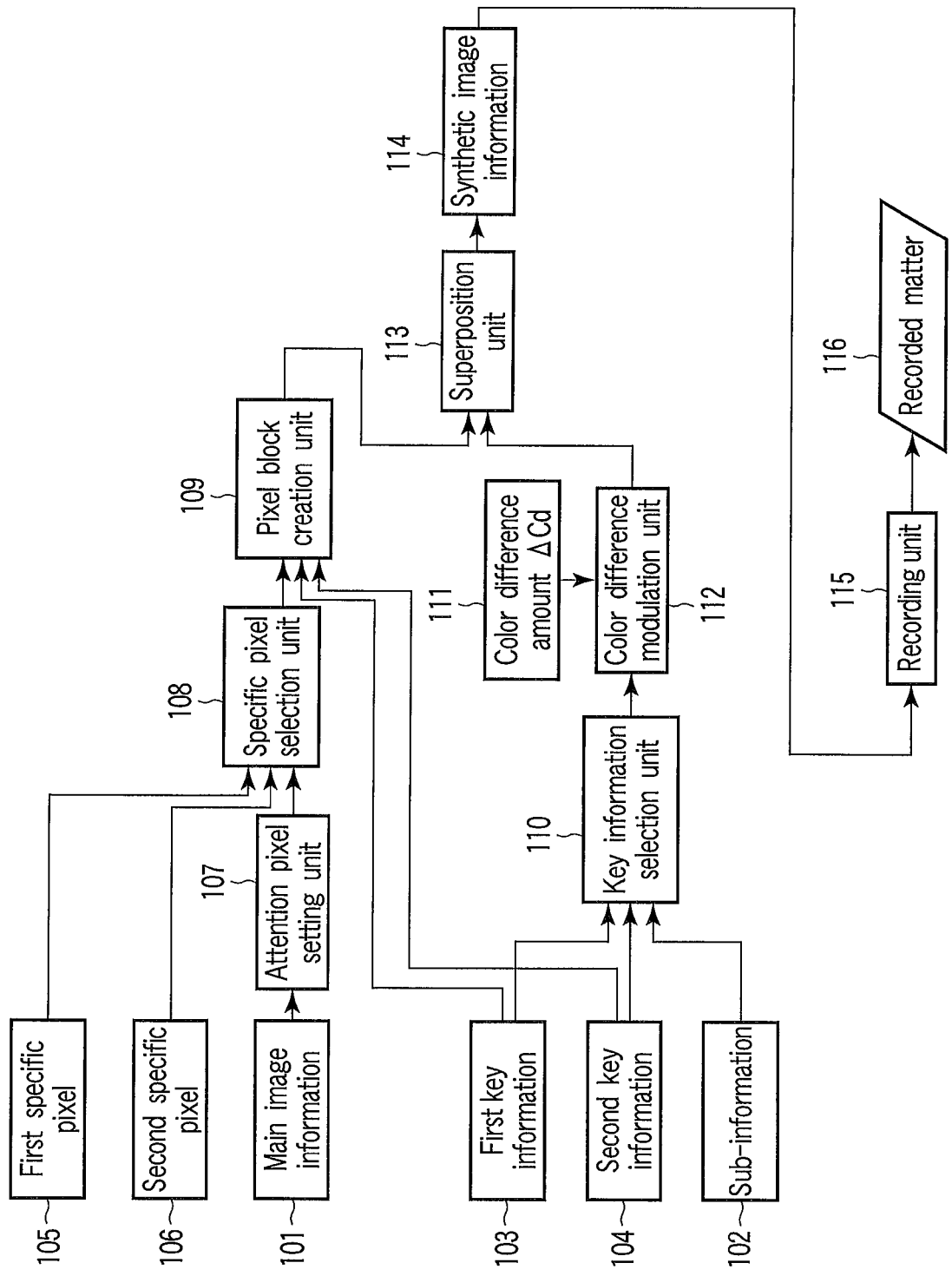
F I G. 1

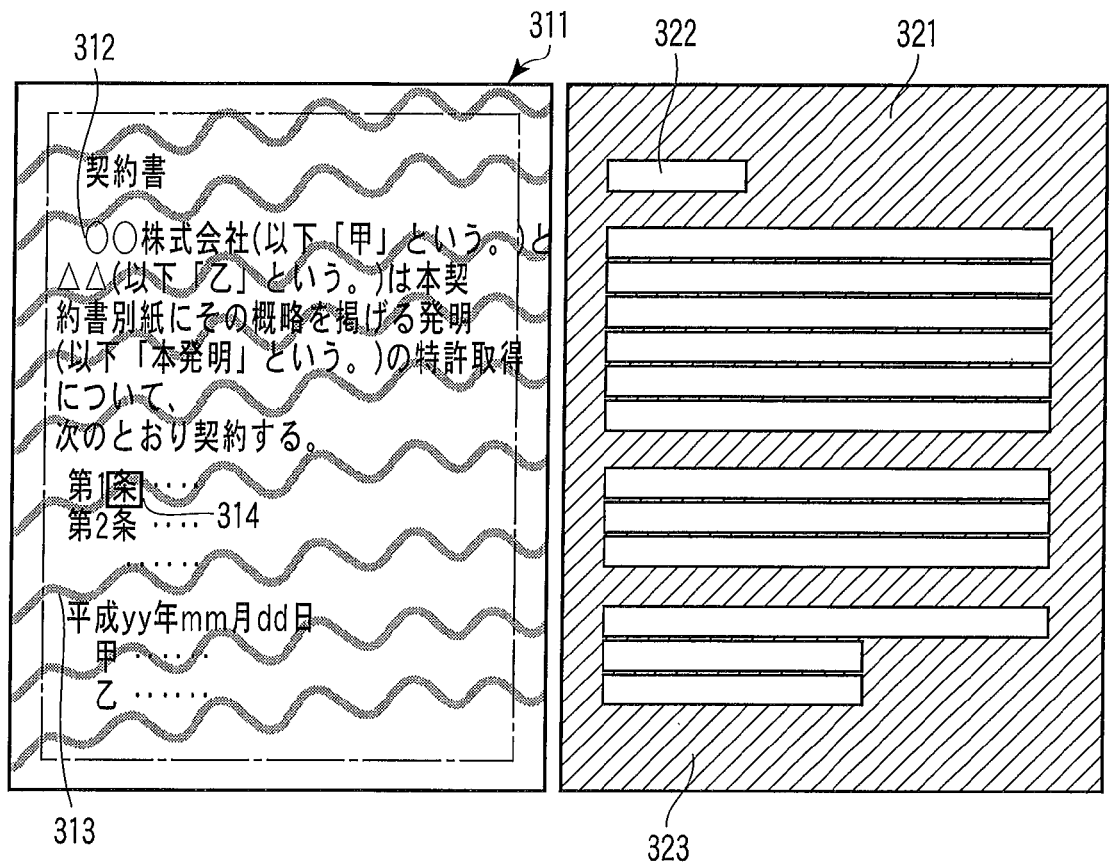
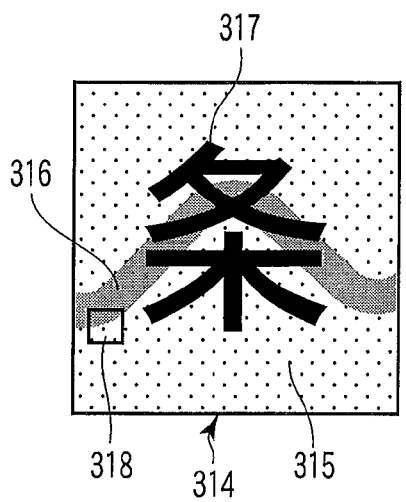
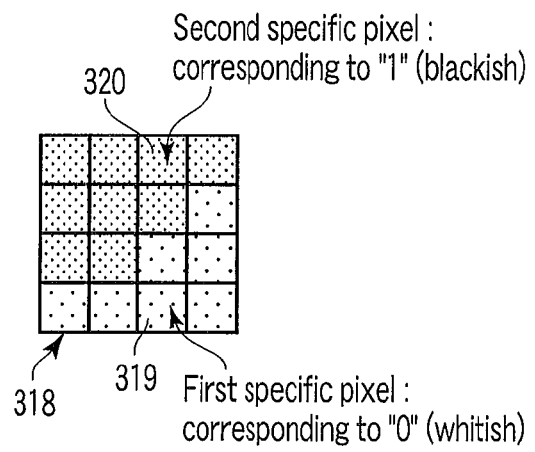
FIG. 4A  FIG. 4D
FIG. 4B  FIG. 4C

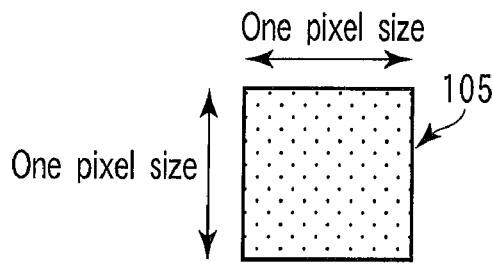
FIG. 5A
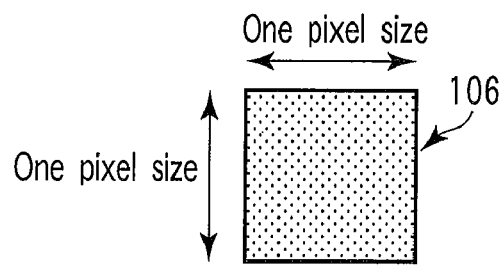
FIG. 5B
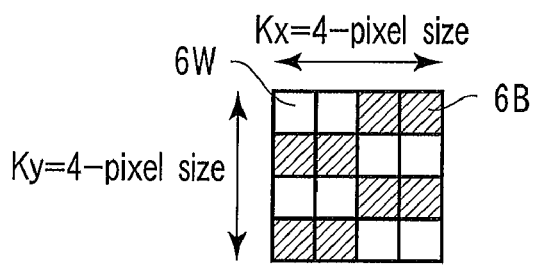
FIG. 6A
FIG. 6B
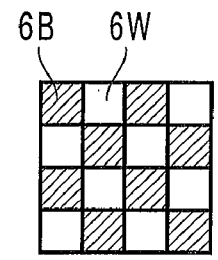
FIG. 6C
FIG. 6D
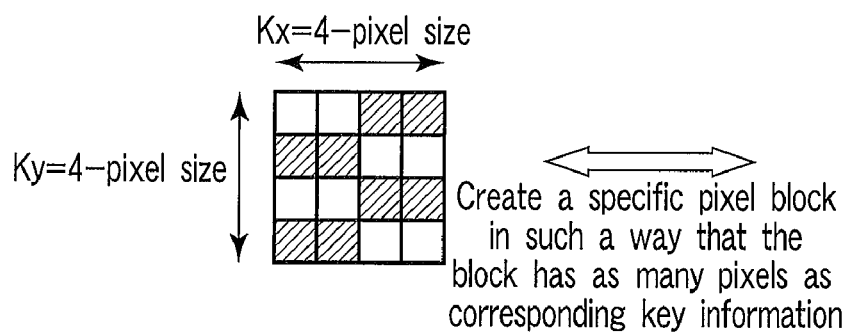
Create a specific pixel block in such a way that the block has as many pixels as corresponding key information
FIG. 7A
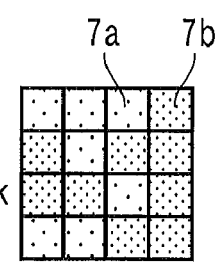
FIG. 7B

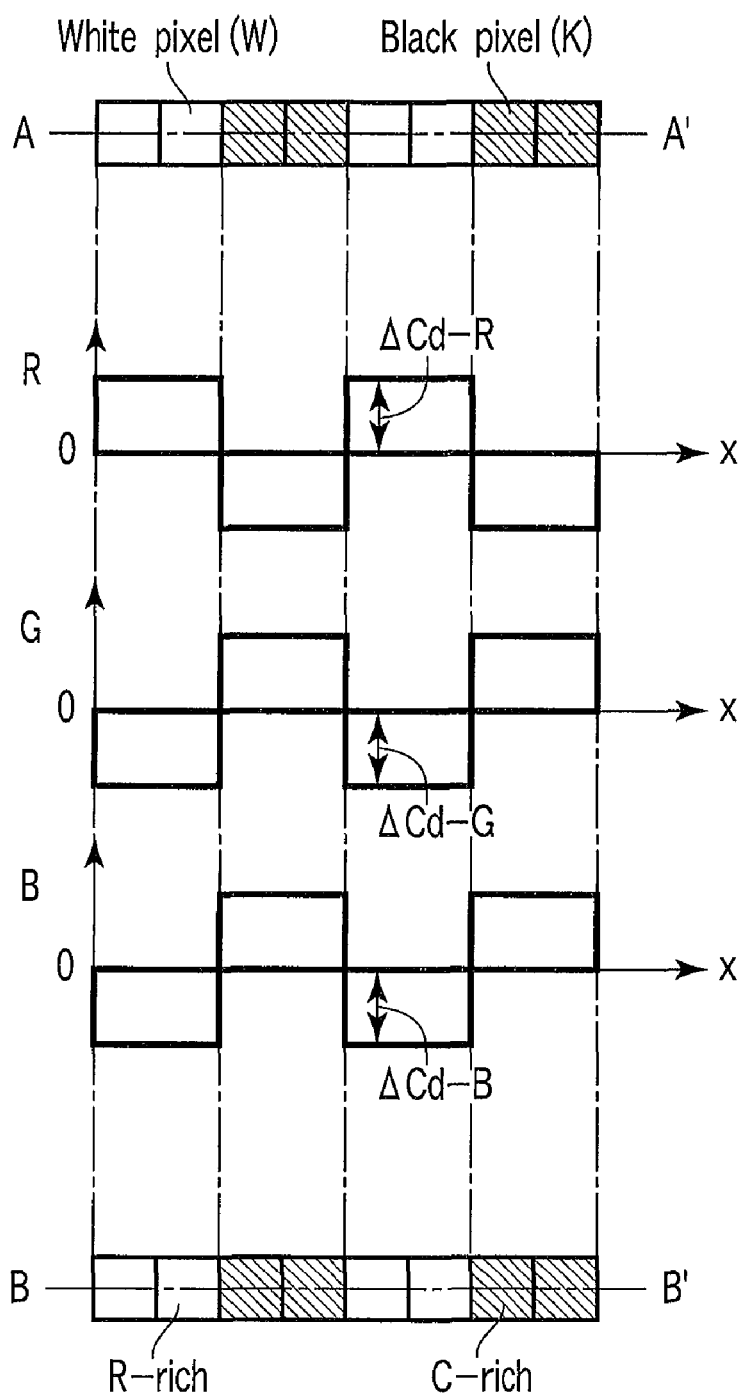

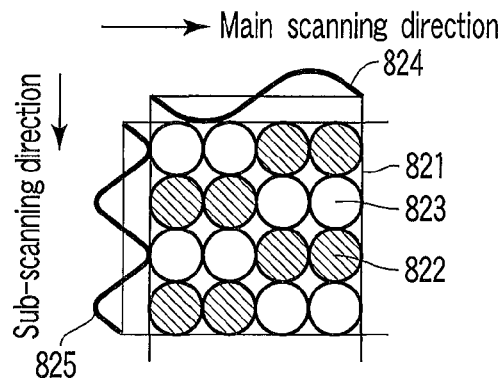
F I G. 11
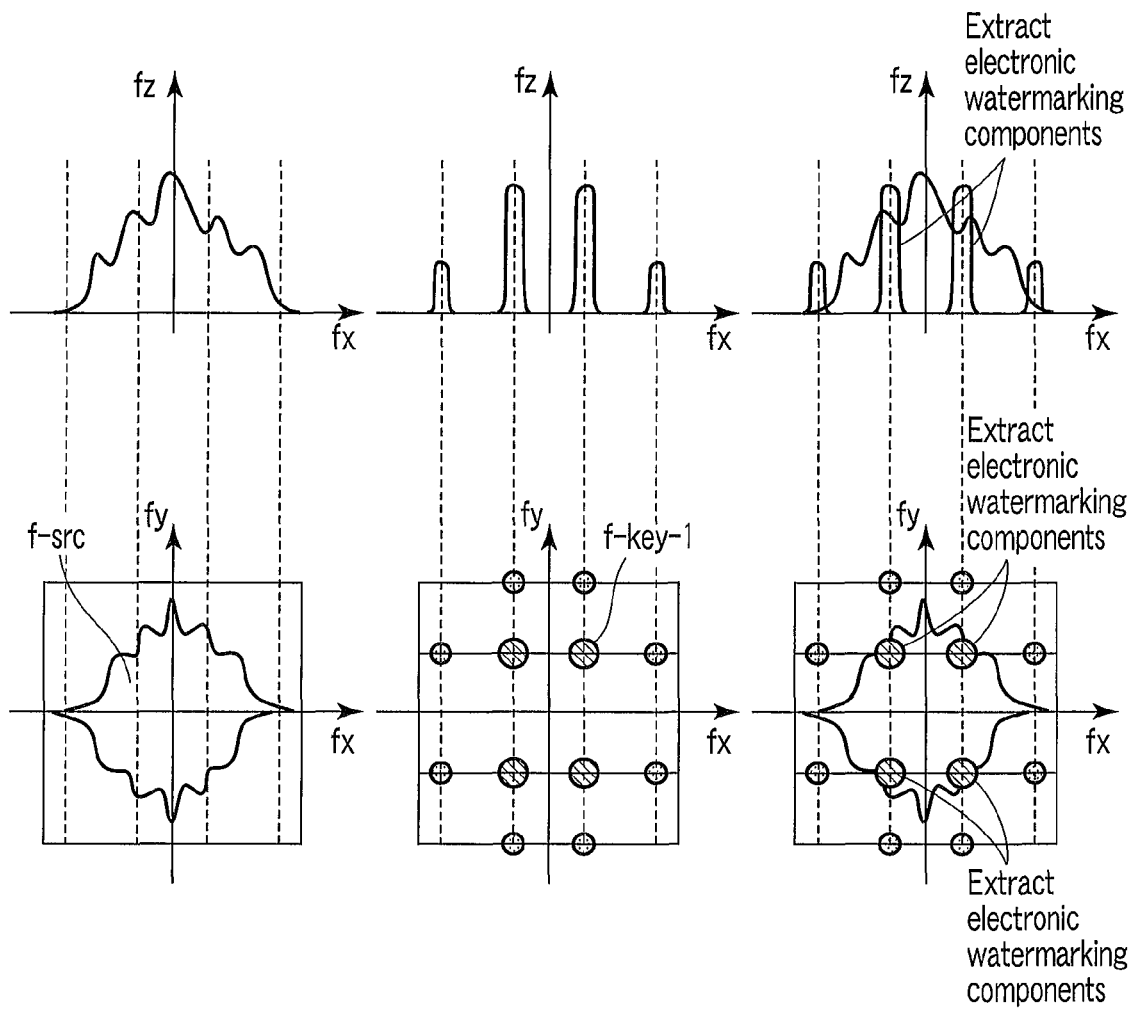
F I G. 12A   F I G. 12B   F I G. 12C

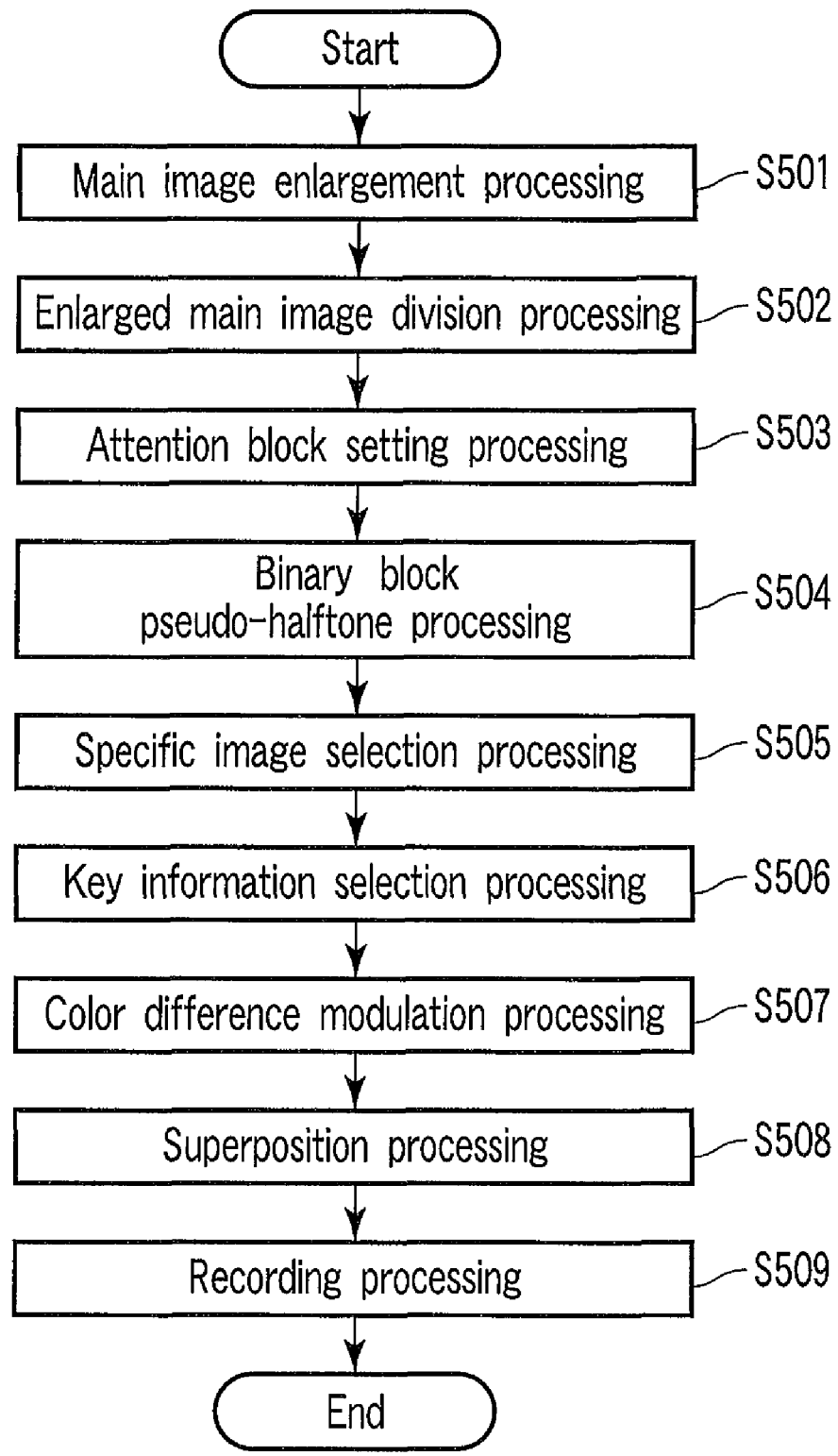
F I G. 16

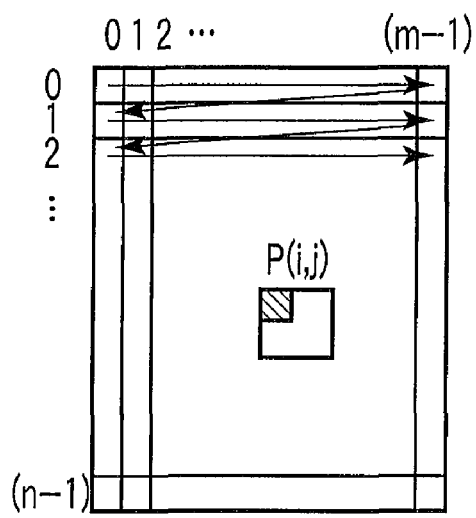
FIG. 19A
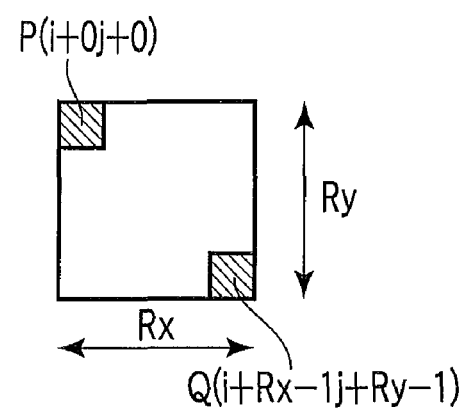
FIG. 19B
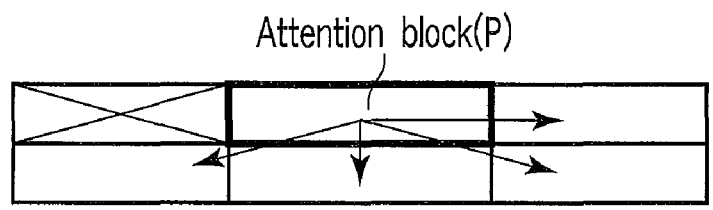
FIG. 20
| –    | Attention pixel(P) | 7/16 |
|------|--------------------|------|
| 3/16 | 5/16               | 1/16 |
FIG. 21

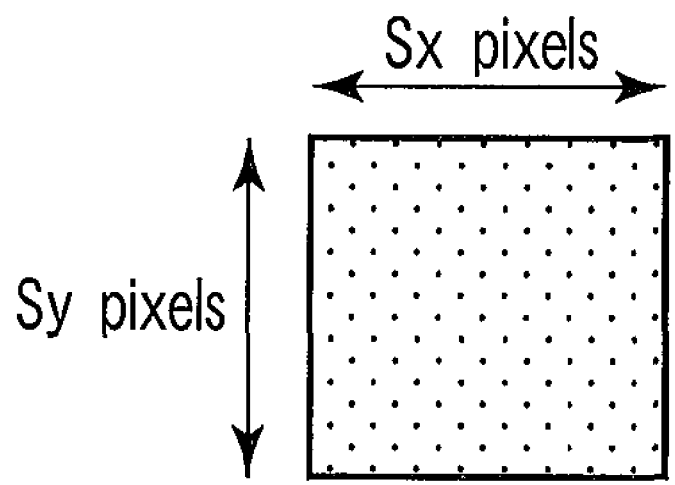
F I G. 22A
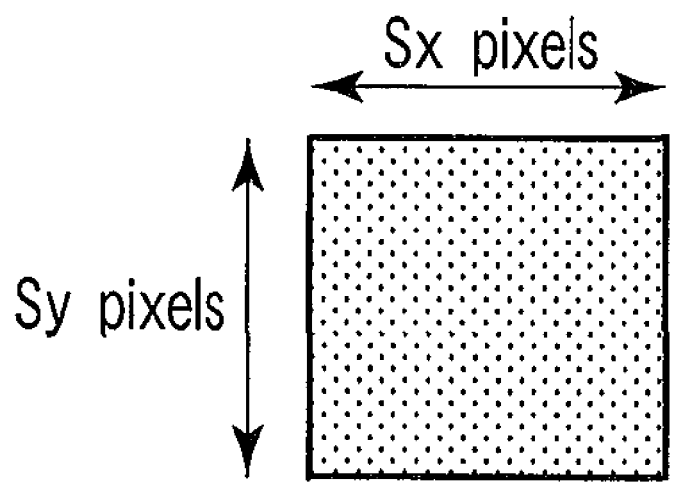
F I G. 22B

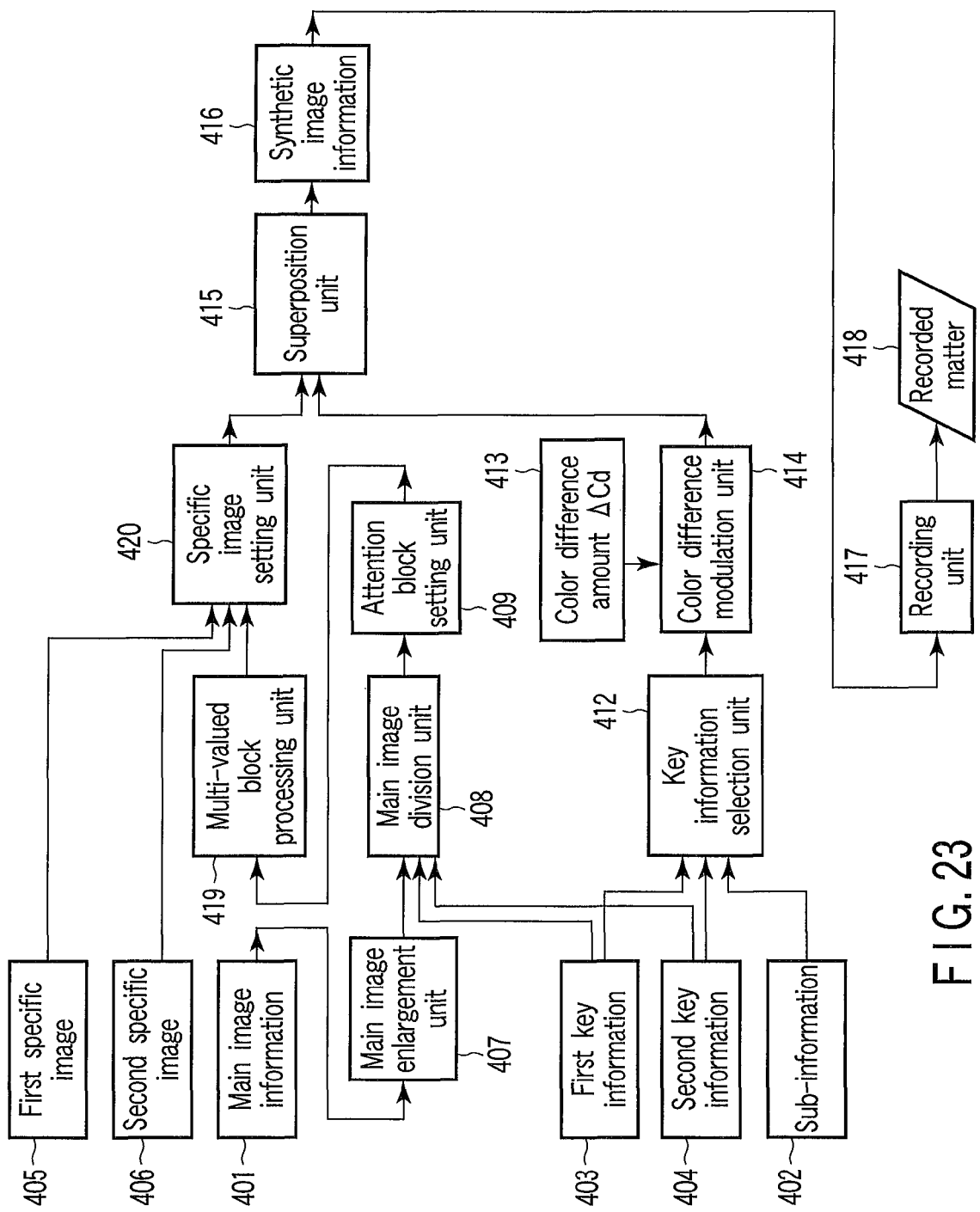
F I G. 23

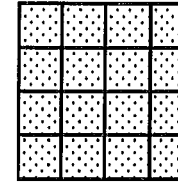
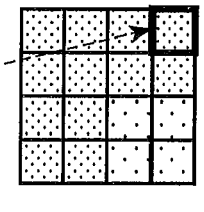
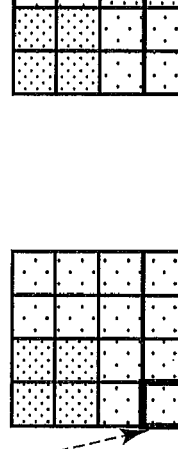
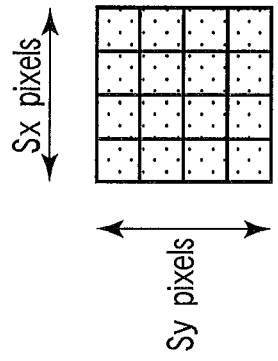
FIG. 25A
FIG. 25B
FIG. 25C (First specific image)
FIG. 25D (Third specific image)
FIG. 25E (Fourth specific image)
FIG. 25F (Fifth specific image)
FIG. 25G (Second specific image)

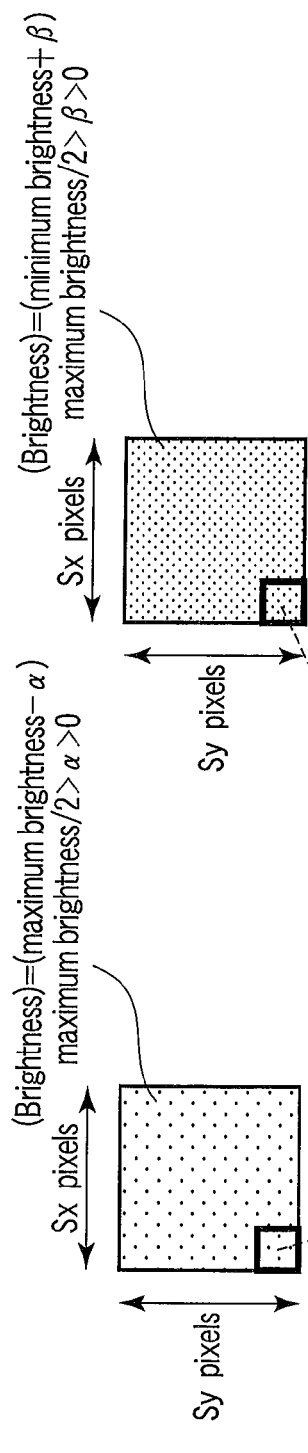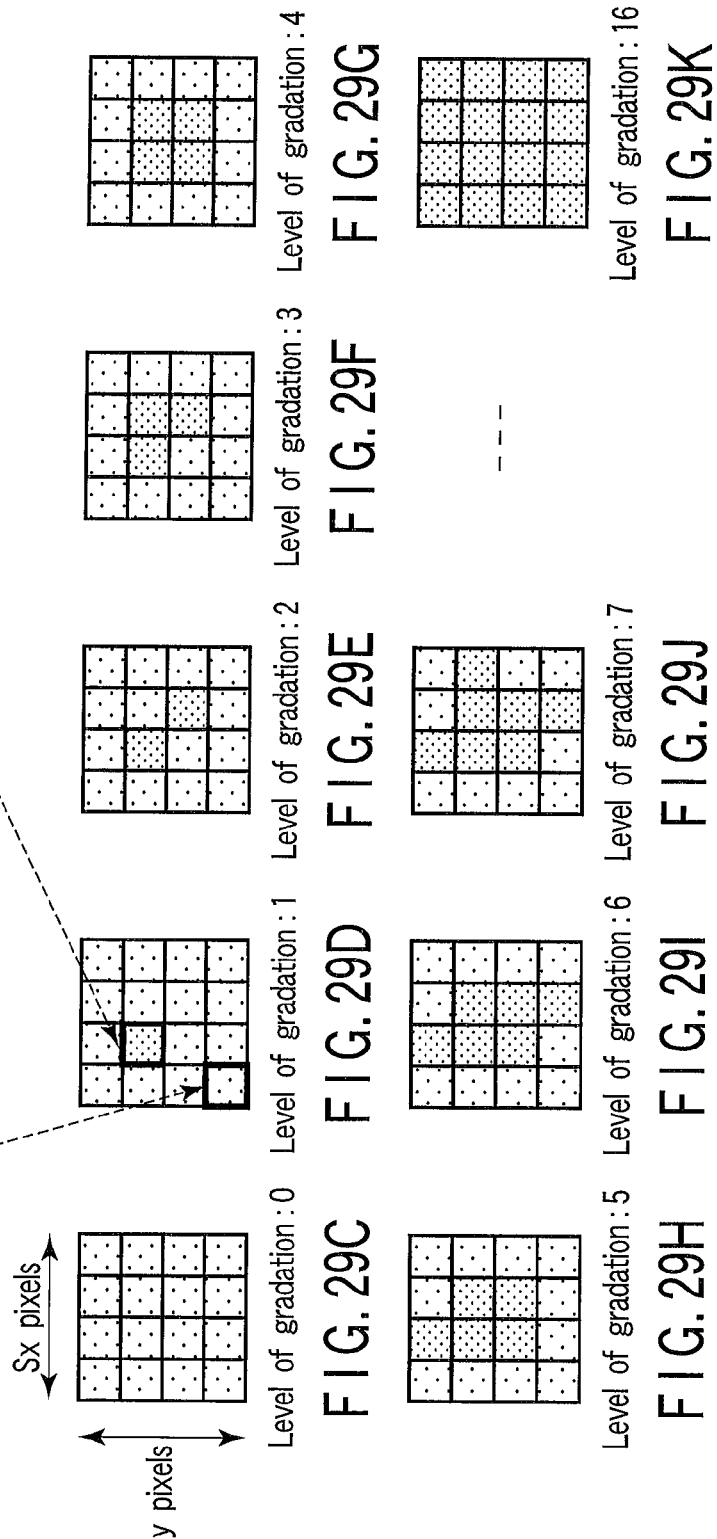

IMAGE PROCESSING METHOD AND IMAGE PROCESSING APPARATUS

CROSS-REFERENCE TO RELATED APPLICATION

This application is based upon and claims the benefit of priority from prior Japanese Patent Applications No. 2007-212840, filed Aug. 17, 2007; and No. 2008-037896, filed Feb. 19, 2008, the entire contents of both of which are incorporated herein by reference.

BACKGROUND OF THE INVENTION

1. Field of the Invention

The present invention relates to an image processing method and an image processing apparatus for creating synthetic image information by embedding other additional sub-information (such as security information) in an invisible state in main image information (such as a face image of a person) in a visible state for synthesis and restoring the sub-information from the synthetic image information.

2. Description of the Related Art

In recent years, with electronization of information and widespread use of the Internet, greater importance is being placed on technologies such as electronic watermarking and electronic signature to prevent forgery or falsification of images. Particularly, the electronic watermarking technology that embeds additional sub-information (such as security information) in an invisible state in main image information (such as a face image of a person) is used as countermeasures against illegal copying, forgery, and alteration of ID cards and photos in which copyright information is embedded.

For example, Japanese Patent No. 3547892 (Patent Document 1) describes an electronic watermarking insertion method of embedding data in image data to be output to printed matter by utilizing characteristics of high spatial frequency components and color difference components that are more difficult for humans to perceive. However, it is basically difficult to apply the method described in Patent Document 1 to binary images (for example, black and white binary images) such as documents.

Also, "Data Embedding in Binary Images by Block Error Diffusion Method", Makoto Nakashizu (Tokyo University of Agriculture and Technology) et al., Journal of IIEEJ (The Institute of Image Electronics Engineers of Japan), Vol. 31, No. 4 (2002)" (Patent Document 2) describes a technique to embed electronic watermarking in binary images by using the error diffusion method in blocks. However, Patent Document 2 describes only evaluation in a state of digital data before printing. That is, Patent Document 2 is not intended for printed images even if the error diffusion method is used. Further, Patent Document 2 does not describe any method of restoring electronic watermarking.

BRIEF SUMMARY OF THE INVENTION

According to an aspect of the present invention, an object of the present invention is to provide an image processing method and an image processing apparatus capable of creating synthetic image information in which electronic watermarking information is embedded in images constituted by various types of pixels and reliably extracting sub-information from the synthetic image information recorded on a recording medium.

According to an aspect of the present invention, there is provided an image processing method of creating synthetic image information in which sub-information is embedded in main image information, comprising: assigning specific information in accordance with a level of gradation of an attention area in the main image information to the attention area; performing color difference modulation processing of key information selected in accordance with a value of the sub-information based on a predetermined color difference amount; and superposing the key information, for which the color difference modulation processing has been performed, on an area to which the specific information in the main image information is assigned.

According to an aspect of the present invention, there is provided an image processing apparatus for creating synthetic image information in which sub-information in an invisible state is embedded in main image information, comprising: an attention area setting part which sets an attention area in the main image information; a specific information selection part which assigns specific information in accordance with a value of the attention area set by the attention area setting part to the attention area; a key information selection part which selects, for the sub-information constituted by a first value or a second value, first key information for the first value and second key information for the second value; a color difference modulation part which performs color difference modulation processing on the key information selected by the key information selection part based on a predetermined color difference amount; and a superposition part which superposes the key information, for which the color difference modulation processing has been performed, on an area to which the specific information in the main image information is assigned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing an electronic watermarking embedding processing system as an image processing apparatus according to a first embodiment;

FIG. 4A is a diagram showing a contract document as a second example of the recorded matter created according to the first embodiment;

FIG. 4B is an enlarged view of an image of an area shown in FIG. 4A;

FIG. 4C is an enlarged view of an image of an area shown in FIG. 4B;

FIG. 4D is a diagram exemplifying a mask image for masking areas of characters and around characters;

FIG. 5A exemplifies a first specific pixel (first specific information) in which an attention pixel corresponds to a first color (for example, white);

FIG. 5B exemplifies a second specific pixel (second specific information) in which the attention pixel corresponds to a second color (for example, black);

FIG. 6A is a diagram exemplifying first key information expressed as a binary number;

FIG. 6B exemplifies a binary image as the first key information;

FIG. 6C is a diagram exemplifying second key information expressed as a binary number;

FIG. 6D exemplifies a binary image as the second key information;

FIG. 7A exemplifies the first key information;

FIG. 7B exemplifies a specific pixel block;

FIG. 8A shows a portion (eight horizontal pixels×one vertical pixel) of key information;

FIG. 8B is a diagram showing an R component obtained as a result of color difference modulation processing on a portion of key information shown in FIG. 8A;

FIG. 8C is a diagram showing a G component obtained as a result of color difference modulation processing on a portion of key information shown in FIG. 8A;

FIG. 8D is a diagram showing a B component obtained as a result of color difference modulation processing on a portion of key information shown in FIG. 8A;

FIG. 8E is a diagram showing a result of synthesis of each of the R, G, and B components shown in FIGS. 8B to 8D;

FIG. 11 is a diagram exemplarily showing a state in which the first key information shown in FIG. 6B is recorded on a recording medium;

FIG. 12A is a diagram showing distribution of a space/frequency region as a result of processing by a pixel block creation part;

FIG. 12B is a diagram showing the frequency region of embedded information;

FIG. 12C is a diagram showing distribution of the space/frequency region with respect to synthetic image information as a processing result of superposition processing;

FIG. 16 is a flowchart illustrating the flow of electronic watermarking embedding processing according to the second embodiment;

FIG. 19A is a diagram showing an image coordinate system based on main image information;

FIG. 19B is a diagram exemplifying an attention block;

FIG. 20 is a diagram exemplifying an error diffusion area in block error diffusion processing;

FIG. 21 is a diagram exemplifying an error diffusion coefficient in block error diffusion processing;

FIG. 22A is a diagram exemplifying a first specific image (first specific information);

FIG. 22B is a diagram exemplifying a second specific image (second specific information);

FIG. 23 is a diagram schematically showing the configuration of the electronic watermarking embedding processing system as an image processing apparatus according to a third embodiment;

FIG. 25A is a diagram exemplifying a first specific image (first specific information) associated with a first color;

FIG. 25B is a diagram exemplifying a second specific image (second specific information) associated with a second color;

FIG. 25C is a diagram showing a state in which the first specific image shown in FIG. FIG. 25A is divided into four pixels×four pixels;

FIG. 25D is a diagram exemplifying a third specific image;

FIG. 25E is a diagram exemplifying a fourth specific image;

FIG. 25F is a diagram exemplifying a fifth specific image;

FIG. 25G is a diagram showing a state in which the second specific image shown in FIG. 25B is divided into four pixels× four pixels;

FIG. 29A shows the first specific image corresponding to the maximum brightness value;

FIG. 29B shows the second specific image corresponding to the minimum brightness value;

FIG. 29C is a diagram showing a state in which the first specific image shown in FIG. 29A is divided into 4×4 sizes;

FIG. 29D is a diagram exemplifying a third specific image (specific information) corresponding to a first gradation;

FIG. 29E is a diagram exemplifying a fourth specific image (specific information) corresponding to a second gradation;

FIG. 29F is a diagram exemplifying a fifth specific image (specific information) corresponding to a third gradation;

FIG. 29G is a diagram exemplifying a sixth specific image (specific information) corresponding to a fourth gradation;

FIG. 29H is a diagram exemplifying a seventh specific image (specific information) corresponding to a fifth gradation;

FIG. 29I is a diagram exemplifying an eighth specific image (specific information) corresponding to a sixth gradation;

FIG. 29J is a diagram exemplifying a ninth specific image (specific information) corresponding to a seventh gradation;

FIG. 29K is a diagram showing a state in which the second specific image shown in FIG. 29B is divided into 4×4 sizes;

DETAILED DESCRIPTION OF THE INVENTION

Figure 2:
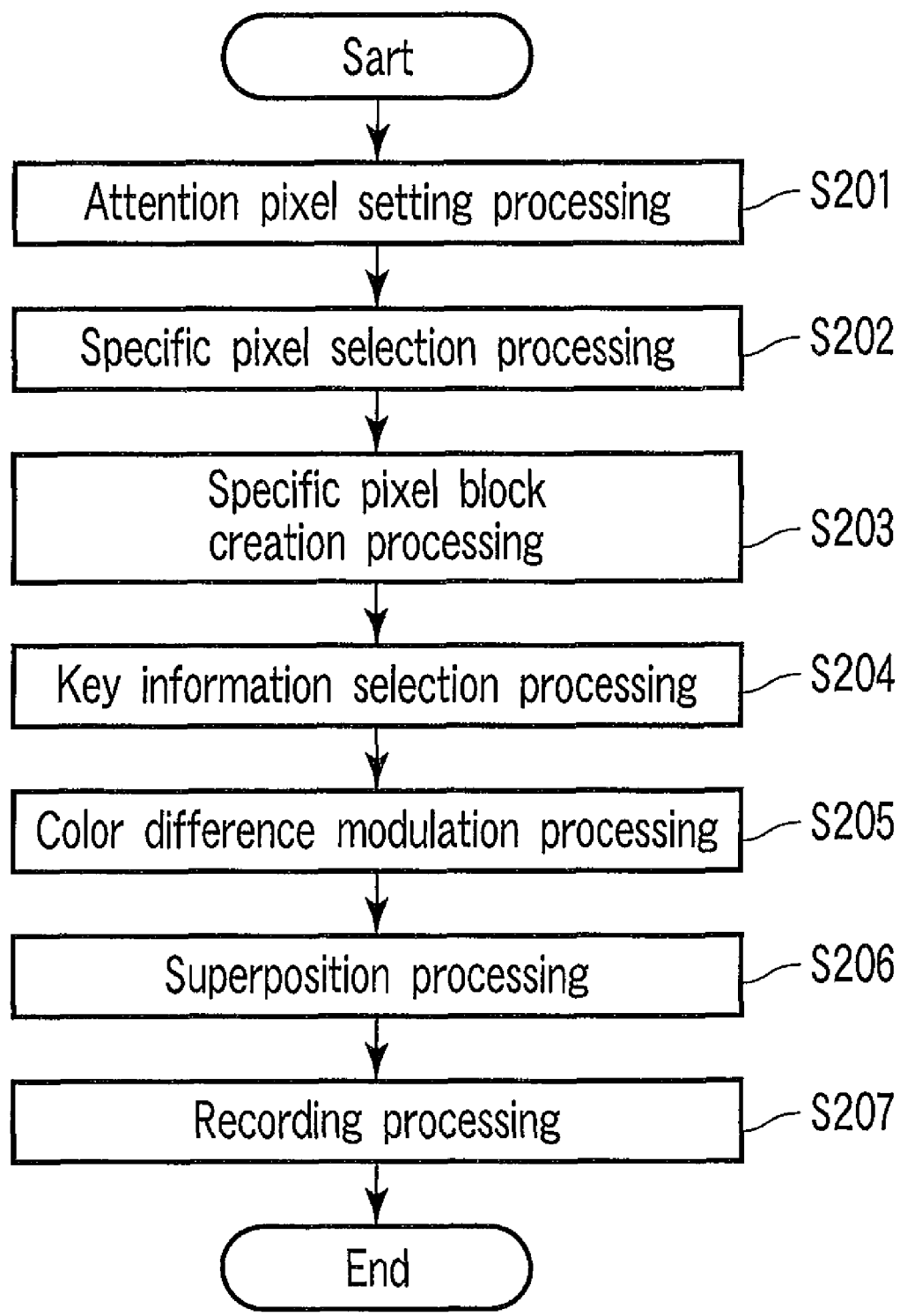
FIG. 2 is a flowchart illustrating a flow of electronic watermarking embedding processing according to the first embodiment.

Embodiments of the present invention will be described below with reference to the drawings.

First, the first embodiment will be described.

The first embodiment described below assumes that electronic watermarking embedding processing is applied to binary images. Also in the first embodiment, it is assumed that images in which electronic watermarking should be embedded are mainly black and white binary images. Images in which electronic watermarking should be embedded are assumed to be, for example, black and white binary images such as contract documents requiring security such as falsification prevention.

FIG. 1 is a block diagram schematically showing an electronic watermarking embedding processing system in an image processing apparatus according to the first embodiment.

The electronic watermarking embedding processing system performs processing to create synthetic image information by embedding sub-information (such as security information) in an invisible state in main image information in a state visible to human eyes. Such processing to create synthetic image information is the electronic watermarking embedding processing.

The electronic watermarking embedding processing system includes an attention pixel setting part 107, a specific pixel selection part 108, a key information selection part 110, a color difference modulation part 112, a pixel block creation part 109, and a superposition part 113. In the configuration example shown in FIG. 1, a recording part 115 is provided in a subsequent stage of the superposition part 113 of the electronic watermarking embedding processing system.

The attention pixel setting part 107 performs processing to set an attention pixel in main image information 101. For example, the main image information 101 consisting of binary (2-step gradation) pixels is input into the attention pixel setting part 107. The attention pixel setting part 107 sets an attention pixel in the input main image information 101.

The specific pixel selection part 108 performs processing to assign a first specific pixel 105 or a second specific pixel 106 to the attention pixel set by the attention pixel setting part 107. For example, if the attention pixel set by the attention pixel setting part 107 corresponds to white (first color), the specific pixel selection part 108 assigns the first specific pixel 105 to the attention pixel. If the attention pixel set by the attention pixel setting part 107 corresponds to white (second color), the specific pixel selection part 108 assigns the second specific pixel 106 to the attention pixel.

The key information selection part 110 is used to perform processing to select key information. The key information selection part 110 selects key information in accordance with sub-information. For example, the key information selection part 110 selects prepared first key information 103 or second key information 104 that is different from the first key information 103 in accordance with "0" (first value) or "1" (second value) of sub-information 102 consisting of binary information.

The color difference modulation part 112 is used to perform color difference modulation processing on the key information with a preset color difference amount 111. The color difference modulation part 112 performs color difference modulation processing with the preset color difference amount 111 for the first key information 103 or the second key information 104 selected by the key information selection part 110.

The pixel block creation part 109 creates a specific pixel block having the same number of pixels as that of the key information in the main image information 101 by grouping specific pixels. That is, the pixel block creation part 109 creates a specific pixel block by grouping the first specific pixel 105 or the second specific pixel 106 selected by the specific pixel selection part 108 so that the specific pixel block has as many pixels as the first key information 103 or the second key information 104.

The superposition part 113 is used to create synthetic image information 114 in which the sub-information 102 in an invisible state is embedded in the main image information 101. The superposition part 113 performs processing, as creation processing of the synthetic image information 114, to superpose key information for which color difference modulation processing has been performed by the color difference modulation part 112 on a specific pixel block in the main image information 101 created by the pixel block creation part 109. The superposition part 113 creates the synthetic image information 114 in which the sub-information 102 in an invisible state is embedded in the main image information 101 by superposing the first key information 103 or the second key information 104 for which color difference modulation processing has been performed by the color difference modulation part 112 on a specific pixel block created by the pixel block creation part 109.

The recording part 115 is used to record (print) the synthetic image information 114 created by the superposition part 113 on a recording medium. That is, the recording part 115 creates a recorded matter 116 by recording (printing) the synthetic image information 114 on a recording medium.

The electronic watermarking embedding processing system has the main image information 101, the sub-information (electronic watermarking information) 102, the first key information 103, the second key information 104, the first specific pixel 105 and the second specific pixel 106 as input information.

The main image information 101 is an image in which electronic watermarking is embedded. That is, the main image information 101 is an image to be protected for the prevention of falsification and the like. Moreover, the main image information 101 is assumed to be binary images. A binary image is an image in which, for example, characters are in black and the background is white. However, the main image information 101 is not limited to black and white binary images and may be binary images of other two colors (for example, binary images of white and red). As the main image information 101, for example, images of a document such as a contract document are assumed.

The sub-information 102 is information (electronic watermarking information) embedded in the main image information 101. That is, the sub-information 102 is information to enhance security of the main image information 101. The sub-information 102 may be prepared information or information provided from outside when needed. In the present embodiment, the sub-information 102 is information represented as binary numbers ("1" or "0").

The first key information 103 and the second key information 104 are key information used to restore the sub-information 102 from synthetic image information in which the sub-information 102 is embedded in the main image information 101. That is, the first key information 103 and the second key information 104 are key information used to restore the sub-information 102 from synthetic image information recorded in the recorded matter 116 as a document such as a contract document. The first key information 103 and the second key information 104 are assumed, for example, to be information prepared in advance.

The first specific pixel 105 and the second specific pixel 106 are information selected in accordance with a processing result by the attention pixel setting part 107. The first specific pixel 105 and the second specific pixel 106 are assumed, for example, to be information prepared in advance.

Next, the flow of processing in an electronic watermarking embedding processing system configured as described above will schematically be described.

FIG. 2 is a flowchart schematically illustrating the flow of processing in the electronic watermarking embedding processing system as the first embodiment.

First, assume that the main image information 101 as a black and white binary image in which electronic watermarking should be embedded has been input to the attention pixel setting part 107. Then, the attention pixel setting part 107 sets an attention pixel from pixels constituting the main image information 101 (step S201). The main image information 101 is a black and white binary image. Thus, the attention pixel set by the attention pixel setting part 107 is white or black. If the main image information 101 is a red and white binary image, instead of a black and white binary image, the attention pixel is white or red.

After the attention pixel is set by the attention pixel setting part 107, the specific pixel selection part 108 selects a specific pixel in accordance with the set attention pixel (step S202). It is assumed, for example, that a first specific pixel and a second specific pixel are set as specific pixels corresponding to the attention pixel in a black and white binary image. In such a case, if the set attention pixel is white, the first specific pixel 105 of the two predetermined specific pixels is selected as the specific pixel, and if the set attention pixel is black, the second specific pixel 106 of the two predetermined specific pixels is selected.

The pixel block creation part 109 performs processing to create a specific pixel block (step S203). In this processing, a specific pixel block in the main image information 101 is created so as to have as many pixels as the key information (the first key information 103 or the second key information 104) by grouping the first specific pixel 105 or the second specific pixel 106 selected by the specific pixel selection part 108.

After the specific pixel block is created, the key information selection part 110 selects the key information in accordance with the sub-information 102 (step S204). The key information selection part 110 selects the prepared first key information 103 or the second key information 104 in accordance with, for example, "0" or "1" of the sub-information 102. That is, the key information selection part 110 selects the first key information 103 if the sub-information 102 is "0", and the second key information 104 if the sub-information 102 is "1".

After the key information is selected by the key information selection part 110, the color difference modulation part 112 performs color difference modulation processing on the selected first key information 103 and the second key information 104 (step S205). In this color difference modulation processing, color difference modulation is performed based on the preset color difference amount ($\Delta Cd$) 111.

After the color difference modulation is performed, the superposition part 113 creates the synthetic image information 114 in which the sub-information 102 in an invisible state is embedded in the main image information 101 by superposing the first key information 103 or the second key information 104 for which color difference modulation processing has been performed by the color difference modulation part 112 on a specific pixel block created by the pixel block creation part 109 (step S206).

After the synthetic image information 114 is created by the superposition part 113, the recording part 115 performs processing to record (print) the created synthetic image information 114 on a recording medium in a visible state (step S207). This processing is processing to create the recorded matter 116 in which synthetic image information is printed. That is, the recording part 115 performs processing to create the highly secure recorded matter 116 in which sub-information is embedded in a black and white binary image such as a contrast document. However, the recording part 115 will print the synthetic image information 114 on a recording medium in color. The reason therefor will be described later.

Next, the recorded matter 116 created by the above processing will be described

Figure 3A:
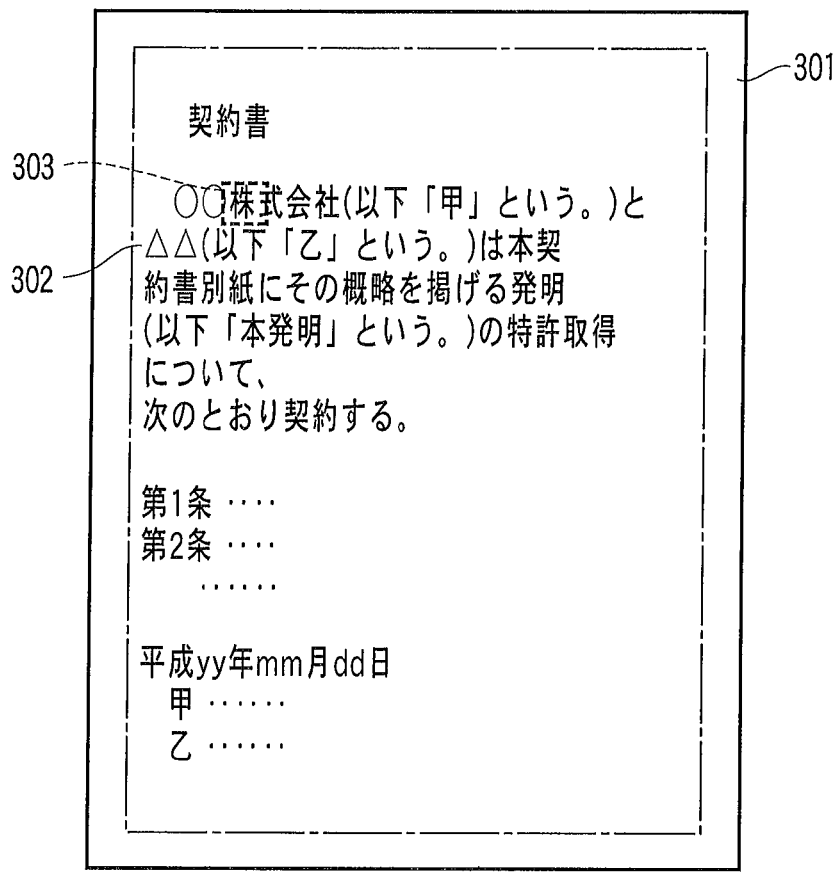
FIG. 3A is a diagram showing a contract document as a first example of a recorded matter created according to the first embodiment.

FIG. 3A is a diagram showing a contract document 301 as a first example of the recorded matter 116.

The contract document 301 shown in FIG. 3A has characters 302 in a visible state printed thereon. The contract document 301 is assumed to have been created by the above electronic watermarking embedding processing. That is, the contract document 301 is assumed to be the recorded matter 116 on which the synthetic image information 114 obtained by performing the above electronic watermarking embedding processing is printed when the main image information 101 is an image (black and white binary image) of a contract document.

The synthetic image information 114 is obtained by embedding the sub-information 102, for which color difference modulation processing has been performed, in the main image information 101 in an invisible state as a black and white binary image. Therefore, the sub-information 102 is not visually recognized by humans and only a black and white image as the main image information 101 is recognized. For example, the contract document 301 in FIG. 3A is visually recognized by humans as a black and white image on which the characters 302 showing contract content are printed in black.

The contract document 301 shown in FIG. 3A is apparently a black and white image. However, in the above processing, the synthetic image information 114 is printed in color in processing to create a recorded matter. That is, an image of the contrast document, in which the sub-information 102 visually not recognizable by humans is embedded, is printed in color in the contract document 301 shown in FIG. 3A.

Figure 3B:
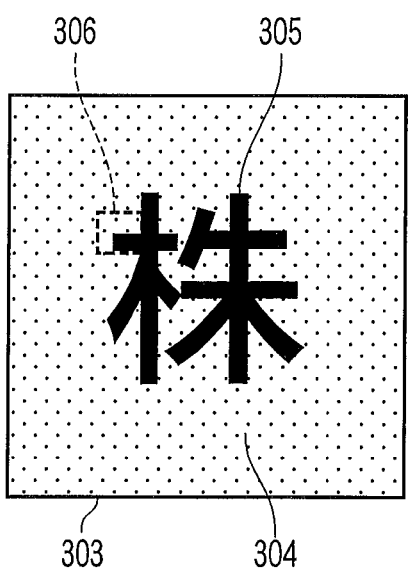
FIG. 3B is an enlarged view of an image of an area shown in FIG. 3A.

FIG. 3B is an enlarged view of an image of an area 303 shown in FIG. 3A.

The area 303 is an image in the vicinity of a character of "kabu". As shown in FIG. 3B, the image of the area 303 consists of an image (background image) 304 of a background portion and an image (character image) 305 of a character portion. In the image of the area 303, the background image 304 is visually recognized as the first color (white) and the character image 305 is visually recognized as the second color (black). Therefore, an image like the above one can be considered to be an image obtained by embedding sub-information in a black and white binary image having a white background image and a black character image. In a black and white binary image, it is assumed that the second color (black), which is the color of characters, has the minimum brightness and the first color (white), which is the color of the background, has the maximum brightness.

Figure 3C:
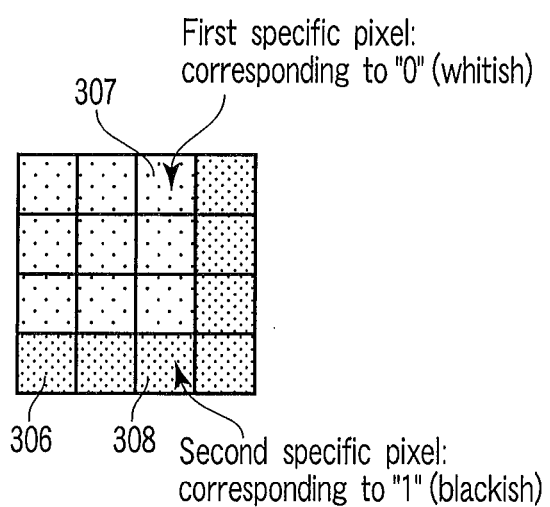
FIG. 3C is an enlarged view of an image of an area shown in FIG. 3B.

FIG. 3C is an enlarged view of an image of an area 306 shown in FIG. 3B.

FIG. 3C exemplarily shows the image of the area 306 in pixels. As shown in FIG. 3C, the image of the area 306 is constituted by a background pixel group 307 constituting a background image and a character pixel group 308 constituting a character image. Each pixel constituting the background is a white pixel in an image (black and white binary image) of the contract document before the sub-information 102 is embedded. Thus, the first specific pixel 105 is assigned to the background pixel group 307. Also, each pixel constituting the character is a black pixel in an image (black and white binary image) of the contract document before the sub-information 102 is embedded. Thus, the second specific pixel 106 is assigned to the character pixel group 308.

In creation processing of the contract document 301, the characters 302 printed in the contract document 301 in a visible state and contract content used as sub-information are associated by using the contract content itself as the sub-information 102 in the electronic watermarking embedding processing. In the contract document 301, it becomes difficult to falsify or alter a portion thereof. As a result, a highly secure contract document can be provided.

FIG. 4A is a diagram showing a contract document 311 as a second example of the recorded matter 116.

In the contract document 311 as shown in FIG. 4A, a pattern 313 is printed in a visible state along with characters 312 indicating contract content. The contract document 311 is assumed to have been created by the above electronic watermarking embedding processing. That is, the contract document 311 is assumed to be the recorded matter 116 on which the synthetic image information 114 obtained by performing the above electronic watermarking embedding processing is printed when the main image information 101 is an image (black and white binary image) of a contract document consisting of the characters 312 and the pattern 313. Therefore, the contract document 311 in FIG. 4A is visually recognized by humans as a black and white image in which the characters 312 indicating contract content and the pattern 313 are printed in black. However, in processing to create the recorded matter, the synthetic image information 114 is printed in color. In other words, an image of the contrast document, in which the sub-information 102 visually not recognizable by humans is embedded, is printed in color in the contract document 311 shown in FIG. 4A.

FIG. 4B is an enlarged view of an image of an area 314 shown in FIG. 4A.

The area 314 is an image in the vicinity of a character of "jou". As shown in FIG. 4B, the image of the area 314 consists of an image (background image) 315 of a background portion, an image (pattern image) 316 of a pattern portion, and an image (character image) 317 of a character portion. In the image of the area 314, the background image 315 is visually recognized as the first color (white) and the pattern image 316 and the character image 317 are visually recognized as the second color (black). Therefore, an image like the above one can be considered to be an image obtained by embedding sub-information in a black and white binary image having a white background image and black pattern and character images. In a black and white binary image, it is assumed that the second color (black), which is the color of the pattern and characters, has the minimum brightness and the first color (white), which is the color of the background, has the maximum brightness.

FIG. 4C is an enlarged view of an image of an area 318 shown in FIG. 4B.

FIG. 4C exemplarily shows the image of the area 318 in pixels. As shown in FIG. 4C, the image of the area 318 is constituted by a background pixel group 319 constituting a background image and a pattern pixel group 320 constituting a pattern image. Each pixel constituting the background is a white pixel in an image (black and white binary image) of the contract document before the sub-information 102 is embedded. Thus, the first specific pixel 105 is assigned to the background pixel group 319. Also, each pixel constituting the pattern is a black pixel in an image (black and white binary image) of the contract document before the sub-information 102 is embedded. Thus, the second specific pixel 106 is assigned to the character pixel group 320.

In the contract document 311 as described above, the image of the contract document before the sub-information 102 is embedded is a black and white binary image having a background image, a character image, and a pattern image. For such an image, an area consisting of the pattern and background can be considered as an area in which the above processing is performed to embed electronic watermarking. Thus, when the above electronic watermarking embedding processing is performed on a binary image consisting of a pattern and a background excluding characters as the main image information, a technique to mask an area of a character portion can be considered.

FIG. 4D is a diagram exemplifying a mask image for masking areas of characters and around characters. A mask image 321 shown in FIG. 4D has the same size as that of the contract document 311. In the mask image 321 shown in FIG. 4D, an area 322 of a white portion is an area corresponding to characters and around characters and where no sub-information is embedded. Also in the mask image 321, an area 323 of a shadow portion is an area corresponding to a pattern and background and where sub-information can be embedded.

The mask image 321 is created in advance in accordance with the layout of a document of contract content. By superposing the mask image 321 on a black and white binary image as the main image information 101, it becomes possible to divide the main image information 101 into an area where no sub-information is embedded and that where sub-information can be embedded. The above electronic watermarking embedding processing becomes applicable to a black and white binary image divided by such a mask image and consisting of a pattern and background. In the contract document 311 obtained by applying electronic watermarking embedding processing to a black and white binary image of a pattern and background excluding characters, when restoration processing of sub-information described later is performed, an area where sub-information is embedded is identified by the mask image 321 to perform restoration processing of sub-information described later.

Next, the specific pixels (the first and second specific pixels) 105/106 will be described.

FIGS. 5A and 5B are diagrams exemplifying specific pixels. FIG. 5A shows an example of the first specific pixel 105 in which an attention pixel corresponds to the first color (for example, white). FIG. 5B shows an example of the second specific pixel 106 in which an attention pixel corresponds to the second color (for example, black). The specific pixels shown in FIGS. 5A and 5B have a size of one horizontal pixel×one vertical pixel.

The value of brightness of the first specific pixel 105 shown in FIG. 5A is a value obtained by subtracting a fixed value α (maximum brightness value/2>α>0) from white (R, G, B)= (maximum brightness value, maximum brightness value, maximum brightness value). The value of brightness of the second specific pixel 106 shown in FIG. 5B is a value obtained by adding a fixed value β (maximum brightness value/2>β>0) to black (R, G, B)=(minimum brightness value, minimum brightness value, minimum brightness value). If, for example, the value of brightness is represented as an 8-bit value, the maximum brightness value is "255" and the minimum brightness value is "0".

Next, the key information (the first and second key information) 103/104 will be described.

FIG. 6A is a diagram exemplifying first key information expressed as a binary number. FIG. 6B exemplifies a binary image as the first key information 103. FIG. 6C is a diagram exemplifying second key information expressed as a binary number. FIG. 6D exemplifies a binary image as the second key information 104. In FIGS. 6B and 6D, a pixel 6W of the first color (for example, white) is represented in white (no diagonal line) and a pixel 6B of the second color (for example, black) is represented in black (with diagonal lines).

The first key information 103 shown in FIG. 6B is a binary image obtained by converting the key information ("0011110000111100") expressed as a binary number shown in FIG. 6A. Here, it is assumed that "0" is replaced by the pixel 6W of the first color and "1" is replaced by the pixel 6B of the second color. If, as shown in FIG. 6B, key information is assumed to be a binary image consisting of 4×4 pixels, the first key information 103 is obtained by replacing the value of each digit of the key information expressed as a binary number shown in FIG. 6A one by one from the first line by the pixel 6W or 6B. The first key information 103 corresponds to "0" in the sub-information 102.

Also, the second key information 104 shown in FIG. 6D is a binary image obtained by converting the key information ("1010010110100101") expressed as a binary number shown in FIG. 6C. Here, it is assumed that "0" is replaced by the pixel 6W of the first color and "1" is replaced by the pixel 6B of the second color. If, as shown in FIG. 6D, key information is assumed to be a binary image consisting of 4×4 pixels, the second key information 104 is obtained by replacing the value of each digit of the key information expressed as a binary number shown in FIG. 6C one by one from the first line by the pixel 6W or 6B. The second key information 104 corresponds to "1" in the sub-information 102.

The size of the binary image of the first key information 103 and the second key information 104 is the horizontal size Kx×vertical size Ky (Kx, Ky: integer). In the example shown in FIGS. 6B and 6C, for example, Kx=Ky=4. However, Kx and Ky depend on the length (number of bits) of key information. Thus, as the number of bits of key information increases, Kx and Ky will also become larger. Also, there is no necessity for Kx and Ky to be the same value.

As described above, binary images (in this example, black and white images) obtained by converting information consisting of binary bit strings can be used as the first and second key information 103/104. It is also possible to use binary images constituted by geometric patterns or those obtained by converting (pseudo) random number patterns created based on predetermined seeds as the first and second key information.

Next, the specific pixel block will be described.

FIG. 7A exemplifies the first key information 103. FIG. 7B exemplifies a specific pixel block. In FIG. 7B, a pixel (sparse halftone dot portion) 7a corresponds to the first specific pixel 105 shown in FIG. 5A and a pixel (dense halftone dot portion) 7b corresponds to the second specific pixel 106 in FIG. 5B.

That is, the pixel block creation part 109 performs specific pixel block creation processing to create a specific pixel block. In the specific pixel block creation processing, the attention pixel setting part 107 sets each pixel constituting a pixel block in the main image information as an attention pixel in accordance with the corresponding sizes Kx and Ky of key information before the specific pixel selected by the specific pixel selection part 108 is arranged for each of such pixels. For example, as shown FIG. 7A, a binary image as key information has a size of 4×4 pixels. In accordance with the size of such key information, the specific pixel block also has the size of, as shown in FIG. 7B, 4×4 pixels. In the specific pixel block, each specific pixel is arranged matching the corresponding coordinate of the main image information 101.

Next, color difference modulation processing will be described.

FIGS. 8A to 8E are diagrams conceptually showing the principle of color difference modulation processing. The color difference modulation processing will be described below with reference to FIG. 8.

As described above, the color difference modulation part 112 performs color difference modulation processing on a processing result by the key information selection part 110 using a color difference amount ΔCd.

FIG. 8A shows a portion (eight horizontal pixels×one vertical pixel) of key information.

In FIG. 8A, a portion of no diagonal line shows white pixels (W) and that of diagonal lines shows black pixels (K). The color difference amount ΔCd can be divided into three components R, G, and B. R, G, and B components of the color difference amount ΔCd will be represented as $\Delta Cd_{-R}$, $\Delta Cd_{-G}$, and $\Delta Cd_{-B}$ respectively.

For 8-bit operations, for example, $\Delta Cd_{-R}$, $\Delta Cd_{-G}$, and $\Delta Cd_{-B}$ are in the range of $255/2 > \Delta Cd_{-R}, \Delta Cd_{-G}, \Delta Cd_{-B} > 0$.

Using such a color difference amount ΔCd, the color difference modulation part 112 performs color difference modulation processing. Formulas (A-1) to (A-6) shown below are used for the color difference modulation processing. In the following formulas, key information is represented as KEY (i, j) and a color difference modulation processing result as CDMRSLT (i, j).

For KEY (i, j)=W (white pixel)

$$CDMRSLT(i, j)_{-R} = +\Delta Cd_{-R} \quad (A\text{-}1)$$

$$CDMRSLT(i, j)_{-G} = -\Delta Cd_{-G} \quad (A\text{-}2)$$

$$CDMRSLT(i, j)_{-B} = -\Delta Cd_{-B} \quad (A\text{-}3)$$

For KEY (i, j)=K (black pixel)

$$CDMRSLT(i, j)_{-R} = -\Delta Cd_{-R} \quad (A\text{-}4)$$

$$CDMRSLT(i, j)_{-G} = +\Delta Cd_{-G} \quad (A\text{-}5)$$

$$CDMRSLT(i, j)_{-B} = +\Delta Cd_{-B} \quad (A\text{-}6)$$

where, the color difference amount ΔCd preferably uses ±γ so that $$(\text{maximum brightness value}/2) > \alpha, \beta \geq \gamma > 0 \quad (B\text{-}1)$$

If the number of bits is eight, the maximum brightness value will be "255". The above β is a fixed value to be added to the second color (black) when creating a specific pixel. The above α is a fixed value to be subtracted from the first color (white) when creating a specific pixel.

By performing color difference modulation corresponding to the key information using the above formulas, the color difference modulation part 112 calculates each of the three color-difference-modulated R, G, and B components. While the degree of difficulty in restoring electronic watermarking decreases with an increasing value of the color difference amount ΔCd, sub-information becomes more likely to be exposed (more likely to be visually recognized by human eyes) if the value of the color difference amount ΔCd is too large.

FIG. 8B is a diagram showing an R component (CDMRSLT$_{-R}$) obtained as a result of color difference modulation processing on a portion of key information shown in FIG. 8A. FIG. 8C is a diagram showing a G component (CDMRSLT$_{-G}$) obtained as a result of color difference modulation processing on a portion of key information shown in FIG. 8A. FIG. 8D is a diagram showing a B component (CDMRSLT$_{-B}$) obtained as a result of color difference modulation processing on a portion of key information shown in FIG. 8A. FIG. 8E is a diagram showing a result of synthesis of each of the R, G, and B components shown in FIGS. 8B to 8D. Here, A-A' shown in FIG. 8A corresponds to B-B' shown in FIG. 8E.

As a result of color difference modulation processing, as shown in FIG. 8E, a portion where key information corresponds to a white pixel (W) becomes rich in red component (R-rich) and a portion corresponding to a black pixel (K) becomes rich in cyan (C-rich). Incidentally, red and cyan are physically in a complementary color relation and thus, become achromatic when red and cyan are mixed.

That is, if each pixel pitch is set at a high resolution (about 300 dpi or more) beyond the range of perception by human eyes, a result of color difference modulation processing as shown in FIG. 8E is visually recognized as achromatic because red and cyan cannot be distinguished by human eyes. Utilizing such a property, key information can be replaced by apparently achromatic information by converting a pattern of key information into that of color difference information described above.

The combination of colors in a complementary color relation is not limited to red and cyan and the combination of green and magenta or blue and yellow may also be used. The assignment of complementary color to various pixels of key information is relative. For example, colors to be assigned to white and block pixels of key information are not limited to red and cyan respectively and if reversed, no problem is principally caused.

Next, superposition processing and recording processing will be described.

As described above, the superposition part 113 creates the synthetic image information 114 in which the sub-information 102 in an invisible state is embedded in the main image information 101 by performing superposition processing of a processing result of the pixel block creation part 109 and that of the color difference modulation part 112.

The recording part 115 creates the recorded matter 116 by recording the synthetic image information 114 created by the superposition part 113 on a recording medium. As a result, the synthetic image information 114 in which the sub-information 102 is embedded in an invisible state as electronic watermarking is printed in the recorded matter 116.

In the superposition processing by the superposition part 113, each of the R, G, and B components is calculated by formulas (C-1) to (C-3) shown below respectively.

$$DES(i,j)_{-R} = SRC2(i,j) + CDMRSLT(i,j)_{-R} \qquad (C\text{-}1)$$

$$DES(i,j)_{-G} = SRC2(i,j) + CDMRSLT(i,j)_{-G} \qquad (C\text{-}2)$$

$$DES(i,j)_{-B} = SRC2(i,j) + CDMRSLT(i,j)_{-B} \qquad (C\text{-}3)$$

In the above formulas, DES (i, j) represents synthetic image information, SRC2 (i, j) a processing result of specific pixel block creation processing, and CDMRSLT (i, j) a processing result of color difference modulation processing.

As described above, in the color difference modulation processing by the color difference modulation part 112, the complementary color relation is used to convert a key information pattern into a color difference information pattern for replacement by apparently achromatic information. Also in the key information selection processing by the key information selection part 110, the sub-information 102 is associated with apparently achromatic information by associating the sub-information 102 and a plurality of pieces of the key information 103/104. That corresponds to CDMRSLT (i,j) in the above formulas (C-1) to (C-3).

Macroscopically, CDMRSLT (i, j) in the above formulas (C-1) to (C-3) appears to be achromatic because any color difference is not recognizable by naked eyes of humans. In other words, because human perception recognizes as "CDMRSLT≈0 (D-1)" and "DES≈SRC2 (D-2)," synthetic image information and a processing result of specific pixel block creation processing appear to be identical. This indicates that sub-information is in an invisible state. Incidentally, (D-1) and (D-2) shown above shows cases in which components of R, G, and B are synthesized.

A processing result of specific pixel block creation processing is obtained by conversion into specific pixels (in the present embodiment, achromatic pixels are used) while maintaining blackness or whiteness of attention pixels in the main image information 101 constituted by a black and white binary image. Thus, a processing result of specific pixel block creation and the main image information 101 are different in a strict sense. However, the synthetic image information 114 and the main image information 101 printed on a recording medium appear apparently almost the same image (similar images).

In other words, human perception recognizes as "SRC≈SRC2 (E-1)" in a printing result. Therefore, from the above formulas (D-2) and (E-1), human perception recognizes as "SRC≈DES (F-1)". Thus, in a printing (recording) result, the main image information 101 and the synthetic image information 114 are almost the same in human perception. This means that the sub-information 102 is embedded in the main image information 101 as electronic watermarking in an invisible state.

Next, restoration processing of electronic watermarking will be described.

Here, electronic watermarking restoration processing for restoring sub-information (electronic watermarking information) from the recorded matter 116 created by processing of the electronic watermarking embedding processing system described above will be described.

Figure 9:
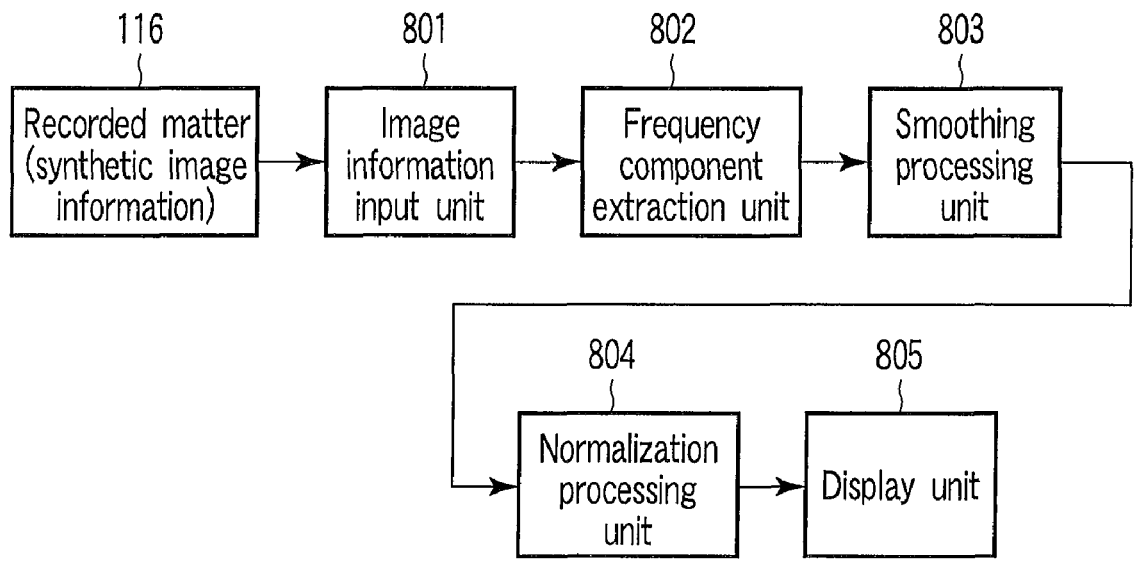
FIG. 9 is a diagram schematically showing a configuration of an electronic watermarking restoration processing system in the image processing apparatus according to the first embodiment.

FIG. 9 is a diagram schematically showing a configuration example of an electronic watermarking restoration processing system in the image processing apparatus according to the first embodiment.

The electronic watermarking restoration processing system includes an image information input part 801, a frequency component extraction part 802, a smoothing processing part 803, a normalization processing part 804, and a display part 805.

The image information input part 801 is used to input image information (image information including synthetic image information) recorded in the recorded matter 116. The image information input part 801 is constituted, for example, by a scanner. In such a case, the image information input part 801 optically reads images recorded in the recorded matter 116 and converts the read image information into digital image information. The image information input part 801 may also be an interface for acquiring image information of the recorded matter 116 read by, for example, a scanner as an external device.

The frequency component extraction part 802 extracts specific frequency components in image information (image information including synthetic image information) input by the image information input part 801. The frequency component extraction part 802 extracts frequency components of the sub-information 102 contained in synthetic image information of an input image.

The smoothing processing part 803 performs smoothing processing of frequency components extracted by the frequency component extraction part 802. The normalization processing part 804 performs normalization processing of processing results by the smoothing processing part 803. The display part 805 displays processing results by the normalization processing part 804 in a display apparatus (not shown).

Next, the flow of processing by the electronic watermarking restoration processing system configured as described above will be described.

Figure 10:
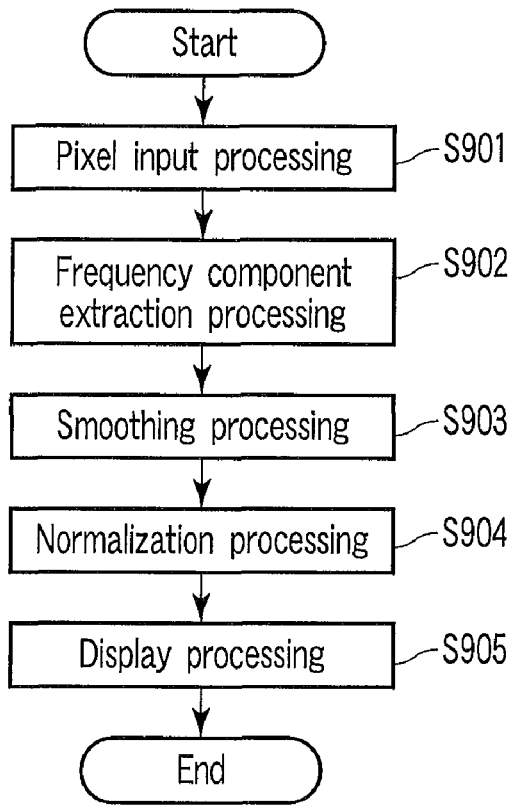
FIG. 10 is a flowchart schematically illustrating the flow of processing in the electronic watermarking restoration processing system.

FIG. 10 is a flowchart schematically illustrating the flow of processing in the electronic watermarking restoration processing system.

First, the image information input part 801 inputs image information containing synthetic image information recorded in the recorded matter 116 as digital image information (step S901). When the image information input part 801 inputs image information containing synthetic image information, the frequency component extraction part 802 performs processing to extract spatial frequency components of key information from the input image information (step S902). For example, the frequency component extraction part 802 performs processing to extract spatial frequency components of, for example, the first key information 103 as a piece among a plurality of pieces of key information.

After frequency components of key information are extracted by the frequency component extraction part 802, the smoothing processing part 803 performs processing to smooth extracted frequency components (step S903). After frequency components of the key information are smoothed, the normalization processing part 804 performs processing on processing results by the smoothing processing part 803 so that input values are normalized to fit into the range of brightness values "0" to "255" (step S904). After frequency components of the key information are smoothed and normalized, the display part 805 displays processing results by the normalization processing part 804 (step S905).

Next, extraction processing of frequency components will be described.

FIG. 11 is a diagram exemplarily showing a state in which the first key information 103 shown in FIG. 6B is recorded on a recording medium. FIG. 11 also exemplarily shows frequency components in a main scanning direction and a sub-scanning direction. In the example shown in FIG. 11, a white circle 823 shows a picture dot recording a white pixel and a diagonal line circle 822 a picture dot recording a black pixel in an area 821 consisting of 4×4 pixels.

In the main scanning direction for the area 821 shown in FIG. 11, a convex wave below and a convex wave above appear, which are present as a waveform 824 just like one cycle of sine wave. In the sub-scanning direction for the area 821 shown in FIG. 11, a waveform 825 like two cycles of sine wave is present.

That is, in the electronic watermarking restoration processing, the sub-information 102 as electronic watermarking embedded using the first key information 103 can be restored by detecting a frequency component of wave in the main scanning direction and that of wave in the sub-scanning direction specific to the first key information 103 as described above from image information (image information including synthetic image information) read from the recorded matter 116. The second key information can also be detected by the same principle.

FIGS. 12A to 12C are pattern diagrams illustrating conversion of the synthetic image information 114 from a spatial region to a frequency region.

FIG. 12A is a diagram showing distribution of a space/frequency region as a result of processing by the pixel block creation part 109. As described above, this distribution has a correlation with the main image information 101. FIG. 12B shows distribution of the space/frequency region for a processing result after performing color difference modulation processing of the first key information 103 by the color difference modulation part 112.

More precisely, FIG. 12B is not a frequency region of the first key information 103, but a frequency region representation of embedded information. However, if focused on one color plane of R, C, and B in color difference modulation processing, frequencies of key information are not changed at all and are converted directly into embedded information. Thus, it is possible to consider "frequency region representation of key information=frequency representation of embedded information".

FIG. 12C is a diagram showing distribution of the space/frequency region with respect to the synthetic image information 114 as a processing result of superposition processing. In FIG. 12C, fx and fy represent two-dimensional frequency coordinates and fz represents an amplitude (intensity) of frequency component. That is, according to the frequency distribution shown in FIG. 12C, electronic watermarking information can be determined by extracting frequency components of key information by frequency component extraction processing by the frequency component extraction part 802.

Next, smoothing processing will be described.

Figure 13A:
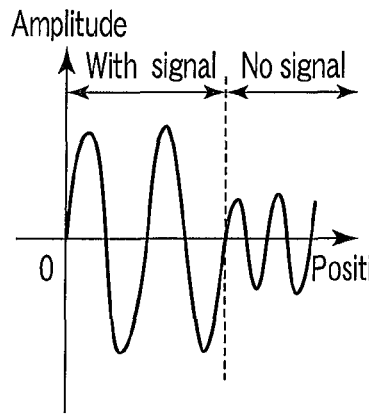
FIG. 13A is a diagram exemplifying a signal extracted by a frequency component extraction part.
Figure 13B:
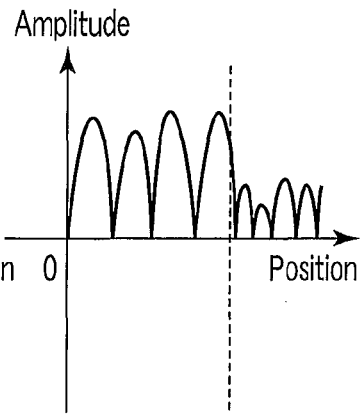
FIG. 13B is a diagram exemplifying a waveform obtained by modifying that shown in FIG. 13A.
Figure 13C:
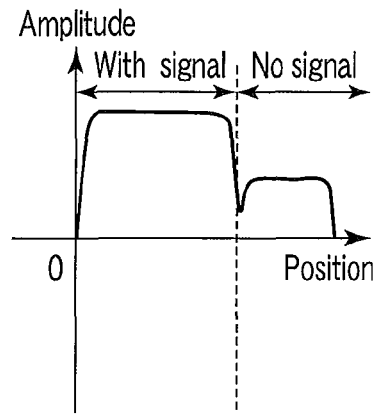
FIG. 13C is a diagram exemplifying the waveform obtained by modifying that shown in FIG. 13B.

FIGS. 13A to 13C are diagrams illustrating processing content by the smoothing processing part 803.

FIG. 13A is a diagram exemplifying a signal extracted by the frequency component extraction part 802. In the example shown in FIG. 13A, the horizontal axis represents the position (the x direction or y direction) and the vertical axis represents the amplitude (=signal intensity). In FIG. 13A, the relation between amplitude and frequency in the frequency distribution is shown as a two-dimensional graph to make a description easier to understand. However, if the relation between amplitude and frequency in the frequency distribution of a two-dimensional image is shown, to be precise, a three-dimensional graph is needed, instead of a simple two-dimensional graph as shown in FIG. 13A.

In FIG. 13A, there are a large wave having a relatively large amplitude and a small wave having a relatively small amplitude. A portion of the wave having a relatively large amplitude is a portion where electronic watermarking has been extracted. For this region, "With signal" is shown in the figure. A portion of the wave having a relatively small amplitude is a portion where electronic watermarking has not been extracted. For this region, "No signal" is shown in the figure.

FIGS. 13B and 13C are diagrams exemplifying a waveform obtained by modifying that shown in FIG. 13A. FIG. 13B shows a waveform obtained by taking an absolute value and performing processing of some fixed multiple. That is, it is difficult to know from the waveform in FIG. 13A whether there is any signal indicating presence/absence of electronic watermarking. Thus, by modifying the waveform in FIG. 13A to the one shown in FIG. 13B or 13C, an area where electronic watermarking is present and that where electronic watermarking is not present are relatively easily separated. Processing to modify the waveform as shown in FIG. 13A to the one as shown in FIG. 13C in this manner is smoothing processing.

Next, normalization processing will be described.

Figure 14A:
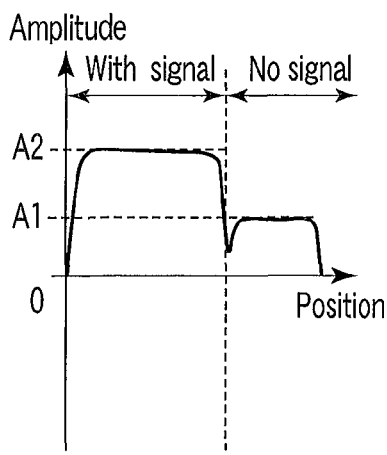
FIG. 14A is a diagram showing the waveform obtained as a result of processing by a smoothing processing part.
Figure 14B:
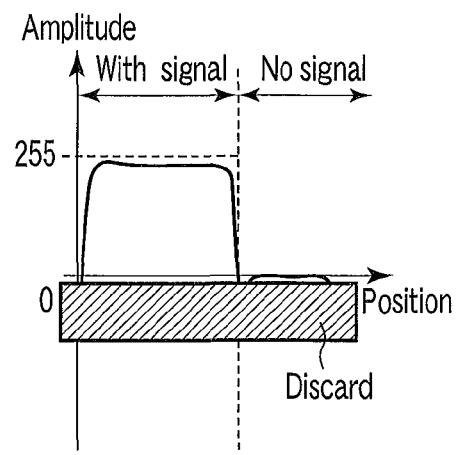
FIG. 14B is a diagram exemplifying a result (waveform) of coordinate transformation as normalization processing on the waveform shown in FIG. 14A.

FIGS. 14A and 14B are diagrams illustrating content of normalization processing by the normalization processing part 804.

FIG. 14A is a diagram showing the waveform obtained as a result of processing by the smoothing processing part 803. In the waveform shown in FIG. 14A, two waveforms, that is, a waveform having a relatively large peak A2 and that having a relatively small peak A1 are mixed. As described above, the waveform of the small peak A1 indicates an area where there is no electronic watermarking. That is, the waveform of the small peak A1 is information that is not necessary in processing to detect sub-information.

Thus, the normalization processing part 804 performs normalization processing as processing to convert a waveform obtained by the smoothing processing part 803 into information showing a detection result of sub-information. In the above normalization processing, for example, coordinate transformation is performed in such a way that only a portion of the waveform shown in FIG. 14A where the amplitude is equal to the peak A1 or more yields a detection result of sub-information.

FIG. 14B is a diagram exemplifying a result (waveform) of coordinate transformation as normalization processing on the waveform shown in FIG. 14A. Here, it is assumed that 8 bits are assigned to each color plane. In such a case, the normalization processing performs coordinate transformation in such a way that the minimum value in the waveform whose amplitude is equal to or more than the peak A1 shown in FIG. 14A becomes "0" and the maximum value becomes "255". As a result, the waveform shown in FIG. 14A is converted into the one shown in FIG. 14B. That is, the waveform shown in FIG. 14B is a waveform that emphasizes an area where electronic watermarking is present. Incidentally, in FIG. 14B, a signal whose amplitude is equal to or less than "0" is shown to make the situation more understandable. Actually, however, signals (waveforms) equal to or less than "0", that is, signals whose amplitude is equal to or less than the peak A1 obtained by the smoothing processing are all discarded and transformation is performed so that other signals fit into the range between "0" and "255". A processing result of such normalization processing is displayed as a result of restoration processing by the display part 805 in a display apparatus (not shown).

With processing described above, sub-information, which is electronic watermarking, can be restored from an image (image including synthetic image information) recorded in the recorded matter 116.

A method of using a mask sheet for restoration can also be considered as another method of electronic watermarking restoration processing. The mask sheet for restoration is a sheet for making the sub-information 102 in the synthetic image information 114 in a state recorded in the recorded matter 116 visible to naked eyes. The mask sheet for restoration is created by recording image information, in which a black pixel of key information used by a bit plane of sub-information to be restored is set as recording information and a white pixel as non-recording information, on a transparent recording medium in recording resolution equal to that of the synthetic image information 114 in the recording part 115. Such a mask sheet for restoration is physically superimposed on the recorded matter 116 in which the synthetic image information 114 is recorded. The sub-information 102, which is electronic watermarking, is thereby made visible (restored) in the synthetic image information 114 recorded in the recorded matter 116.

Such a restoration processing method focuses on the fact that key information is converted into color difference amounts of complementary color combinations by color difference modulation processing to create apparent achromatic information. In the mask sheet for restoration, a black pixel is recorded at a position corresponding to a pixel of the first color in synthetic image information and a position corresponding to a pixel of the second color is not recorded. Thus, if the mask sheet for restoration is correctly superimposed on the synthetic image information 114, a black pixel corresponding to the first color is blocked by black and a non-recording pixel corresponding to the second color is transparent and passed through. That is, if the mask sheet for restoration is correctly superimposed on the synthetic image information 114, one of the first and second colors in complementary color relation becomes visible and the other color is blocked and invisible. Because the color balance of color difference deteriorates in this state, a portion where sub-information is embedded is not visually recognized as achromatic and thus becomes visible.

In the electronic watermarking embedding processing in the first embodiment, as described above, sub-information in an invisible state can be embedded in main image information as a binary image while apparently remaining as a binary image. In the electronic watermarking restoration processing in the first embodiment, sub-information can be restored from synthetic image information created by the electronic watermarking embedding processing.

Next, the second embodiment will be described.

In the second embodiment, processing to embed sub-information in a multi-valued image will be described. Also in the description that follows, as one application example, processing to embed sub-information in a face image for personal authentication in an ID card as a multi-valued image is assumed.

Figure 15:
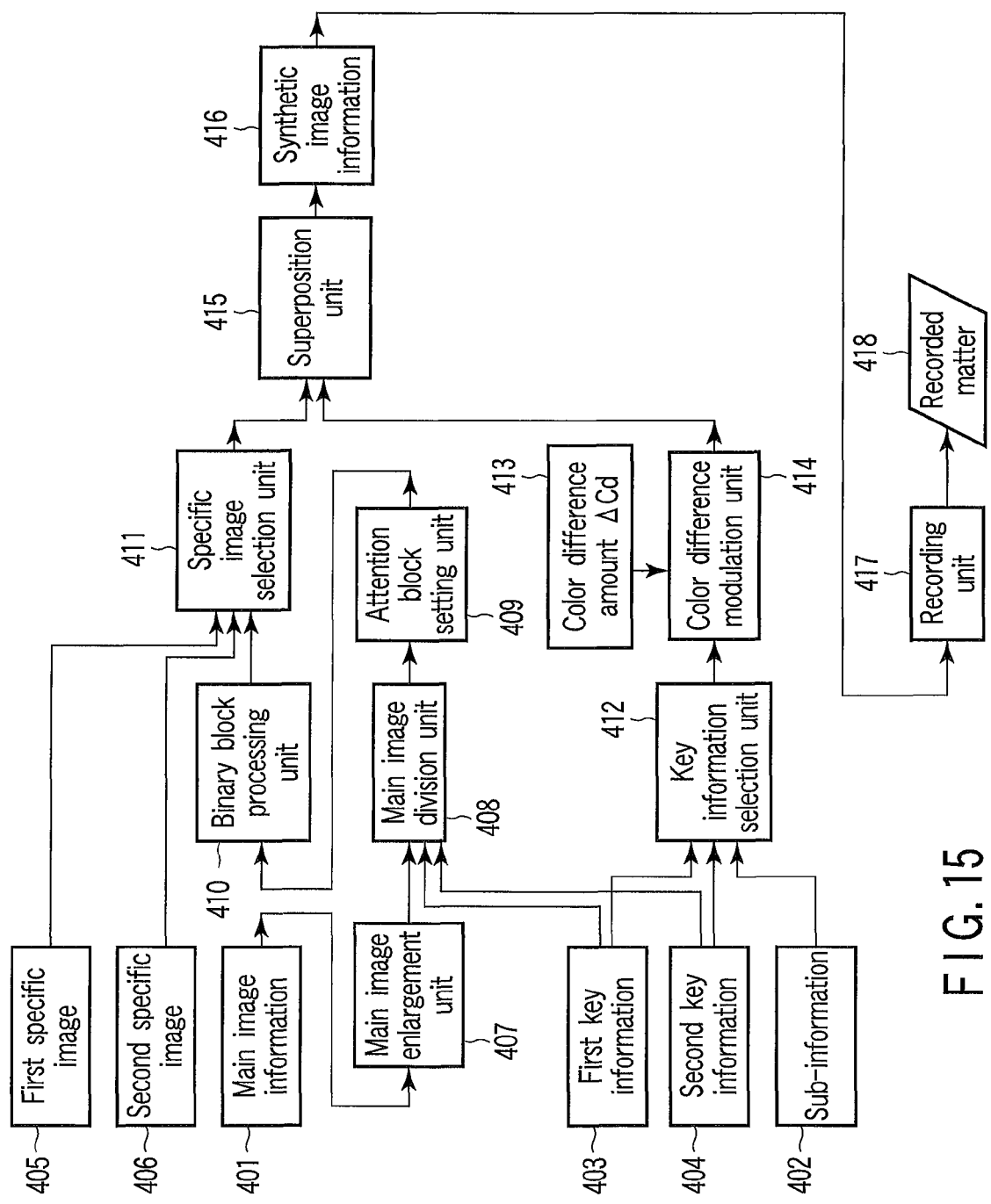
FIG. 15 is a diagram schematically showing the configuration of the electronic watermarking embedding processing system as an image processing apparatus according to a second embodiment.

FIG. 15 is a diagram schematically showing the configuration of the electronic watermarking embedding processing system as an image processing apparatus according to the second embodiment.

The electronic watermarking embedding processing system as the second embodiment performs processing (electronic watermarking embedding processing) to create synthetic image information in which sub-information (such as security information) in an invisible state is embedded in main image information constituted by multi-valued pixels.

The electronic watermarking embedding processing system shown in FIG. 15 includes a main image enlargement part 407, a main image division part 408, an attention block setting part 409, a binary block processing part 410, a specific image selection part 411, a key information selection part 412, a color difference modulation part 414, a superposition part 415, and a recording part 417.

The main image enlargement part 407 is used to perform processing to input main image information 401 and processing (main image enlargement processing) to create enlarged main image information obtained by enlarging the input main image information 401. The main image enlargement part 407 performs processing to create enlarged main image information by enlarging the main image information 401 as a multi-valued image constituted by multi-valued pixels in a predetermined main image enlargement ratio.

The main image division part 408 is used to perform processing (enlarged main image division processing) to divide the enlarged main image information into small blocks. The main image division part 408 performs processing to divide the enlarged main image information obtained by the main image enlargement part 407 into small blocks in units of enlargement ratio.

The attention block setting part 409 is used to perform processing to set an attention block. The attention block setting part 409 performs processing (attention block setting processing) to set an attention block to small blocks obtained by division by the main image division part 408.

The binary block processing part 410 performs processing to binarize an attention block as the minimum unit. The binary block processing part 410 performs processing (block pseudo-halftone processing) to binarize an attention block set by the attention block setting part 409 as the minimum unit using the block error diffusion method.

The specific image selection part 411 is used to perform processing to select a specific image. If a processing result by the binary block processing part 410 corresponds to white (first color), the specific image selection part 411 assigns a first specific image 405 constituted by a plurality of pixels. If a processing result by the binary block processing part 410 corresponds to black (second color), the specific image selection part 411 assigns a second specific image 406 constituted by a plurality of pixels that are different from those of the first specific image 405.

The key information selection part 412 is used to perform processing to select key information. The key information selection part 412 performs processing (key information selection processing) to select first key information 403 or second key information 404 in accordance with "0" (first value) of sub-information 402 constituted by binary information or "1" (second value).

The color difference modulation part 414 is used to perform color difference modulation processing. The color difference modulation part 414 performs color difference modulation processing on the first key information 403 or the second key information 404 selected by the key information selection part 412 with a preset color difference amount 413.

The superposition part 415 is used to perform processing to create synthetic image information 416 by embedding the sub-information 402 in part of the main image information 401. The superposition part 415 performs processing (superposition processing) to superpose the first key information 403 or the second key information 404, for which color difference modulation processing has been performed by the color difference modulation part 414, on the first specific image 405 or the second specific image 406 assigned to a block binarized by the binary block processing part 410 in the main image information 401. Accordingly, the superposition part 415 creates the synthetic image information 416 in which the sub-information 402 in an invisible state is embedded in the main image information 401.

The recording part 417 is used to perform processing (recording processing) to record (print) the synthetic image information 416 created by the superposition part 415 on a recording medium. Accordingly, the recording part 417 creates a recorded matter 418 to be used, for example, as an ID card.

Also in the electronic watermarking embedding processing system as the second embodiment, information such as the main image information 401, the sub-information (electronic watermarking information) 402, the first key information 403, the second key information 404, the first specific image 405, and the second specific image 406 is handled.

The main image information 401 is assumed to be a multi-valued image constituted by multi-valued pixels. For example, the main image information 401 is a multi-valued image (multi-valued information) such as a face image for personal authentication in an ID card whose forgery or alteration should be prevented. The sub-information 402 is electronic watermarking information embedded in the main image information 401. The sub-information 402 is used to enhance security of the main image information 401.

The first key information 403 and the second key information 404 are preset information. The first key information 403 and the second key information 404 are used when the sub-information 402 is embedded in the main image information 401. Also, the first key information 403 and the second key information 404 are information serving as keys when the sub-information 402 as electronic watermarking information is restored from the recorded matter 418 such as an ID card on which synthetic image information having sub-information embedded therein is printed.

The first specific image 405 and the second specific image 406 are assumed to be information prepared in advance. The first specific image 405 and the second specific image 406 are images used in accordance with a processing result by the binary block processing part 410.

Next, the flow of processing in the electronic watermarking embedding processing system as the second embodiment configured as described above will be described.

FIG. 16 is a flowchart illustrating the flow of processing by the electronic watermarking embedding processing system as the second embodiment.

First, the main image enlargement part 407 inputs the main image information 401 constituted by multi-valued pixels. After the main image information 401 is input, the main image enlargement part 407 creates enlarged main image information by enlarging the input main image information 401 in a predetermined main image enlargement ratio (step S501).

After the enlarged main image information is created, the main image division part 408 divides the enlarged main image information created by the main image enlargement part 407 into small blocks in accordance with the first key information 403 and the second key information 404 (step S502). The size of the small blocks is determined in connection with the size of key information.

After the enlarged main image information is divided into the small blocks, the attention block setting part 409 sets an attention block to each small block (step S503).

After the attention block is set to each small block by the attention block setting part 409, the binary block processing part 410 binarizes the attention block as the minimum unit by the block error diffusion method (step S504). That is, the binary block processing part 410 performs binary block error diffusion processing based on a predetermined threshold (for example, threshold=128). As a result, all pixel values of the attention block are binarized before being determined as the first color (white pixel) or the second color (black pixel).

After the attention block is binarized, the specific image selection part 411 determines a specific image in accordance with the pixel value of the binarized attention block (step S505). That is, the specific image selection part 411 performs processing to select one of the first specific image 405 and the second specific image 406 in accordance with the pixel value of the binarized attention block. For example, if the attention block binarized by the binary block processing part 410 corresponds to the first color (white), the specific image selection part 411 selects the first specific image 405 and, if the attention block binarized by the binary block processing part 410 corresponds to the second color (black), the specific image selection part 411 selects the second specific image 406.

The key information selection part 412 selects one of the first key information 403 and the second key information 404 in accordance with the sub-information 402 (step S506). For example, if the sub-information 402 is "0," the key information selection part 412 selects the first key information 403 and, if the sub-information 402 is "1," the key information selection part 412 selects the second key information 404.

After the key information in accordance with the sub-information 402 is selected, the color difference modulation part 414 performs color difference modulation processing on the first key information 403 or the second key information 404 selected by the key information selection part 412 based on the predetermined color difference amount (ΔCd) 413 (step S507).

After a specific image is assigned to the binarized attention block and color-difference-modulated key information is obtained, the superposition part 415 performs processing to superpose the color-difference-modulated key information 403/404 corresponding to the sub-information 402 on the attention block to which the specific image 405/406 is assigned (step S508). That is, the superposition part 415 superposes the first key information 403 or the second key information 404, for which color difference modulation processing has been performed by the color difference modulation part 414, on the attention block to which the first specific image 405 or the second specific image 406 is assigned. Accordingly, the superposition part 415 creates the synthetic image information 416 by embedding the sub-information 402 in an invisible state in the input main image information 401.

After the synthetic image information 416 is created by the superposition part 415, the recording part 417 performs processing to record (print) the synthetic image information 416 on a recording medium (step S509). Accordingly, the recording part 417 creates the recorded matter 418 in which the synthetic image information is printed and used, for example, as an ID card. However, the recording part 417 performs processing to print the synthetic image information 416 in a recording medium in color regardless of whether the main image information 401 is a color image or a binary image. This is for the reason explained in the first embodiment.

Next, an application example of the second embodiment will be described.

Figure 17:
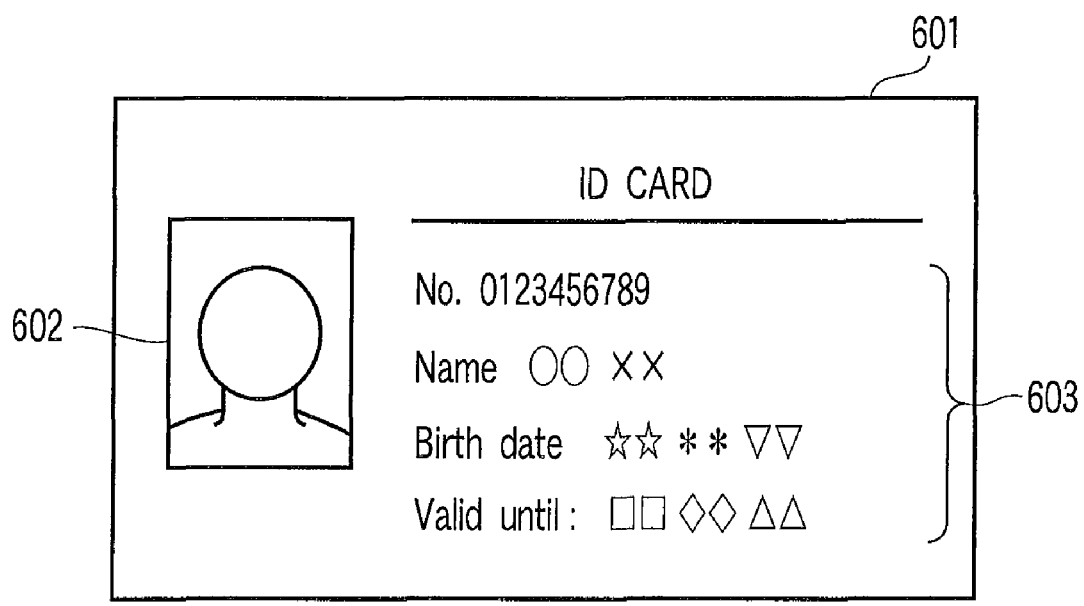
FIG. 17 is a pattern diagram showing a first application example to an ID card in the second embodiment.

FIG. 17 is a diagram showing an appearance of an ID card 601 as an example of the recorded matter 418.

A face image 602 is recorded in the ID card 601 shown in FIG. 17. The face image 602 is a face image of the owner of the ID card 601. The face image 602 is created by the electronic watermarking embedding processing described above with reference to FIGS. 15 and 16 and recorded on a recording medium. Also, personal control information 603 such as an identification number (so-called ID number), a name, a date of birth, and an expiration date is recorded in the ID card 601. The personal control information 603 described above is used as the sub-information 402 in the above electronic watermarking embedding processing.

Accordingly, the face image 602 and the personal control information 603 recorded in the ID card 601 are associated. As a result, it becomes difficult to alter or falsify a portion of the ID card 601, leading to enhanced security.

Figure 18:
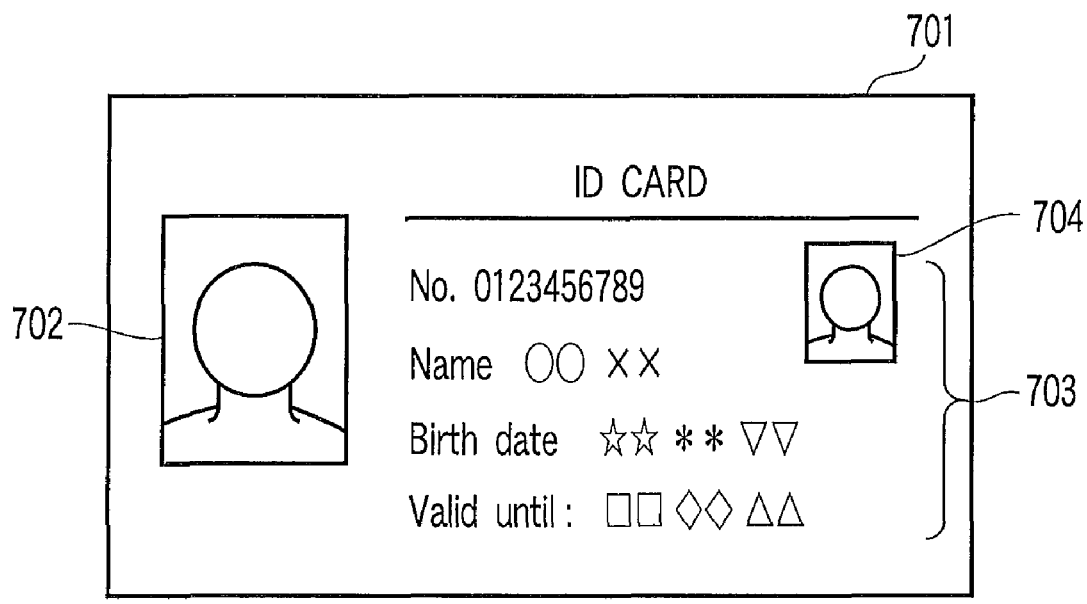
FIG. 18 is a pattern diagram showing a second application example to the ID card in the second embodiment.

FIG. 18 is a diagram showing an appearance of an ID card 701 as an example of the recorded matter 418.

The ID card 701 shown in FIG. 18 has two face images 702/704 recorded thereon. The two face images 702/704 are both face images of the owner of the ID card 701. One face image 702 on the ID card 701 records face image information in color in which no electronic watermarking information is embedded. The other face image 704 records synthetic image information obtained by embedding electronic watermarking information in face image information recorded as the face image 702. That is, the face image 704 is created by the above electronic watermarking embedding processing described with reference to FIGS. 15 and 16 and recorded on a recording medium. An image like the face image 704 is generally called a ghost image. Also, personal control information 703 such as the identification number (so-called ID number), name, date of birth, and expiration date is recorded in the ID card 701. The personal control information 703 described above is used as the sub-information (electronic watermarking information) in the above electronic watermarking embedding processing.

On the ID card 701 shown in FIG. 18, the face image 702, which is an ordinary face image, and the face image 704 (ghost image) in which electronic watermarking information is embedded are recorded. Thus, in order to falsify the face image on the ID card 701 (fake the owner), two locations of the face image 702 and the face image 704 must be changed. This means that the ID card 701 shown in FIG. 18 is more secure than the ID card 601 shown in FIG. 17.

Next, processing by the binary block processing part 410 will be described.

FIG. 19A is a diagram showing an image coordinate system based on the main image information 401. In the example shown in FIG. 19A, it is assumed that the main image information 401 is scanned, starting from the base point (0, 0), from left to right and top to bottom.

FIG. 19B is a diagram exemplifying an attention block. The attention block shown in FIG. 19B is a small block having Rx pixels as the horizontal size and Ry pixels as the vertical size. Binary block pseudo-halftone processing is performed in units of the attention block shown in FIG. 19B.

The binary block processing part 410 uses block error diffusion processing as the binary block pseudo-halftone processing. FIGS. 20 and 21 are diagrams illustrating the block error diffusion processing. The error diffusion processing is generally used in ink jet printers and the like and is an FM modulation method for pseudo-halftone representation. The error diffusion processing is a kind of random dither. The error diffusion processing is a technique of pseudo-halftone processing aimed at minimizing local average errors between an original image and a processed image.

The block error diffusion processing is error diffusion processing performed in small blocks, instead of in pixels normally performed. FIG. 20 is a diagram exemplifying an error diffusion area in block error diffusion processing. As shown in FIG. 20, processing to diffuse a quantization error to surrounding four blocks from an attention block (P) is performed by the block error diffusion processing. FIG. 21 is a diagram exemplifying an error diffusion coefficient in block error diffusion processing. In the block error diffusion processing, a quantization error is diffused in the proportions of the error diffusion coefficient as shown in FIG. 21.

Next, the above specific images (the first specific image 405 and the second specific image 406) will be described.

FIG. 22A is a diagram exemplifying the first specific image 405. FIG. 22B is a diagram exemplifying the second specific image 406. That is, if the attention block has the first color (for example, white), the first specific image 405 as shown in FIG. 22A is selected. If the attention block has the second color (for example, black), the second specific image 406 as shown in FIG. 22B is selected. The specific images shown in FIGS. 22A and 22B have each a size of Sx horizontal pixels×Sy vertical pixels. The value of brightness of the first specific image 405 shown in FIG. 22A is a value obtained by subtracting a fixed value α (maximum brightness value/2>α>0) from white (R, G, B)=(maximum brightness value, maximum brightness value, maximum brightness value). The value of brightness of the second specific image 406 shown in FIG. 22B is a value obtained by adding a fixed value β (maximum brightness value/2>β>0) to black (R, G, B)=(minimum brightness value, minimum brightness value, minimum brightness value). If, for example, the value of brightness is represented as an 8-bit value, the maximum brightness value is "255" and the minimum brightness value is "0".

Key information similar to that used in the first embodiment can be applied in the second embodiment. That is, key information similar to the first key information 103 and the second key information 104 described in the first embodiment can be used as the first key information 403 and the second key information 404 and therefore, a detailed description thereof is omitted.

Processing similar to that by the key information selection part 110, the color difference modulation part 112, the superposition part 113, and the recording part 115 described in the first embodiment can be applied as processing by the key information selection part 412, the color difference modulation part 414, the superposition part 415, and the recording part 417. Thus, a detailed description thereof is omitted.

Next, relations among various kinds of information described above will be described.

Relations of sizes of the main image information 401, the first specific image 405, the second specific image 406, the first key information 403, the second key information 404, and the attention block are shown below:

$$Ax \cdot SRCx = Bx \cdot Sx_{(u)} = Cx \cdot Bx \cdot Kx_{(v)} \quad \text{(G-1)}$$

$$Ay \cdot SRCy = By \cdot Sy_{(u)} = Cy \cdot By \cdot Ky_{(v)} \quad \text{(G-2)}$$

$$Ax \geq Sx_{(u)} = Rx \quad \text{(G-3)}$$

$$Ay \geq Sy_{(u)} = Ry \quad \text{(G-4)}$$

where each symbol used in the above formulas (G-1) to (G-4) is defined as follows:

SRCx: Horizontal size of the main image information 401 (number of pixels)

SRCy: Vertical size of the main image information 401 (number of pixels)

Ax: Enlargement ratio of the main image information 401 (horizontal)

Ay: Enlargement ratio of the main image information 401 (vertical)

Bx, By: Positive integer

Sx: Horizontal size of the specific images 405/406 (number of pixels), u=1, 2

Sy: Vertical size of the specific images 405/406 (number of pixels), u=1, 2

Cx, Cy: Positive integer

Kx: Horizontal size of the key information 403/404 (number of pixels), u=1, 2

Ky: Vertical size of the key information 403/404 (number of pixels), u=1, 2

Rx: Horizontal size of the attention block (number of pixels)

Ry: Vertical size of the attention block (number of pixels)

In the second embodiment, as described above, sub-information in an invisible state can be embedded in binarized attention blocks in main image information constituted by multi-valued pixels. Also, the sub-information can be restored from synthetic image information created by the electronic watermarking embedding processing described in the second embodiment by the electronic watermarking restoration processing described in the first embodiment.

Next, the third embodiment will be described.

FIG. 23 is a diagram schematically showing the configuration of the electronic watermarking embedding processing system as an image processing apparatus according to the third embodiment.

The configuration example shown in FIG. 23 has a configuration similar to that shown in FIG. 15 described as the second embodiment. In the configuration example shown in FIG. 23, the binary block processing part 410 shown in FIG. 15 is replaced by a multi-valued block processing part 419 and the specific image selection part 411 is replaced by a specific image setting part 420. That is, in the configuration example shown in FIG. 23, other components than the multi-valued block processing part 419 and the specific image setting part 420 perform processing similar to that performed by each component shown in FIG. 15. Thus, a detailed description of other components than the multi-valued block processing part 419 and the specific image setting part 420 is omitted.

The multi-valued block processing part 419 performs block error diffusion processing in which an attention block is the minimum unit. The multi-valued block processing part 419 makes each block multi-valued by using the block error diffusion method with the attention block set by the attention block setting part 409 as the minimum unit.

The specific image setting part 420 is used to perform processing to determine a specific image. If a block made multi-valued by the multi-valued block processing part 419 is white (first color), the specific image setting part 420 assigns the first specific image 405 to the block. If a block made multi-valued by the multi-valued block processing part 419 is black (second color), the specific image setting part 420 assigns the second specific image 406 to the block. Further, if a block made multi-valued by the multi-valued block processing part 419 is halftone between white and black, the specific image setting part 420 creates third and subsequent specific images by combining the first specific image 405 and the second specific image 406 and assigns one of created specific images to the block.

Next, the flow of processing in the electronic watermarking embedding processing system as the third embodiment configured as described above will be described.

Figure 24:
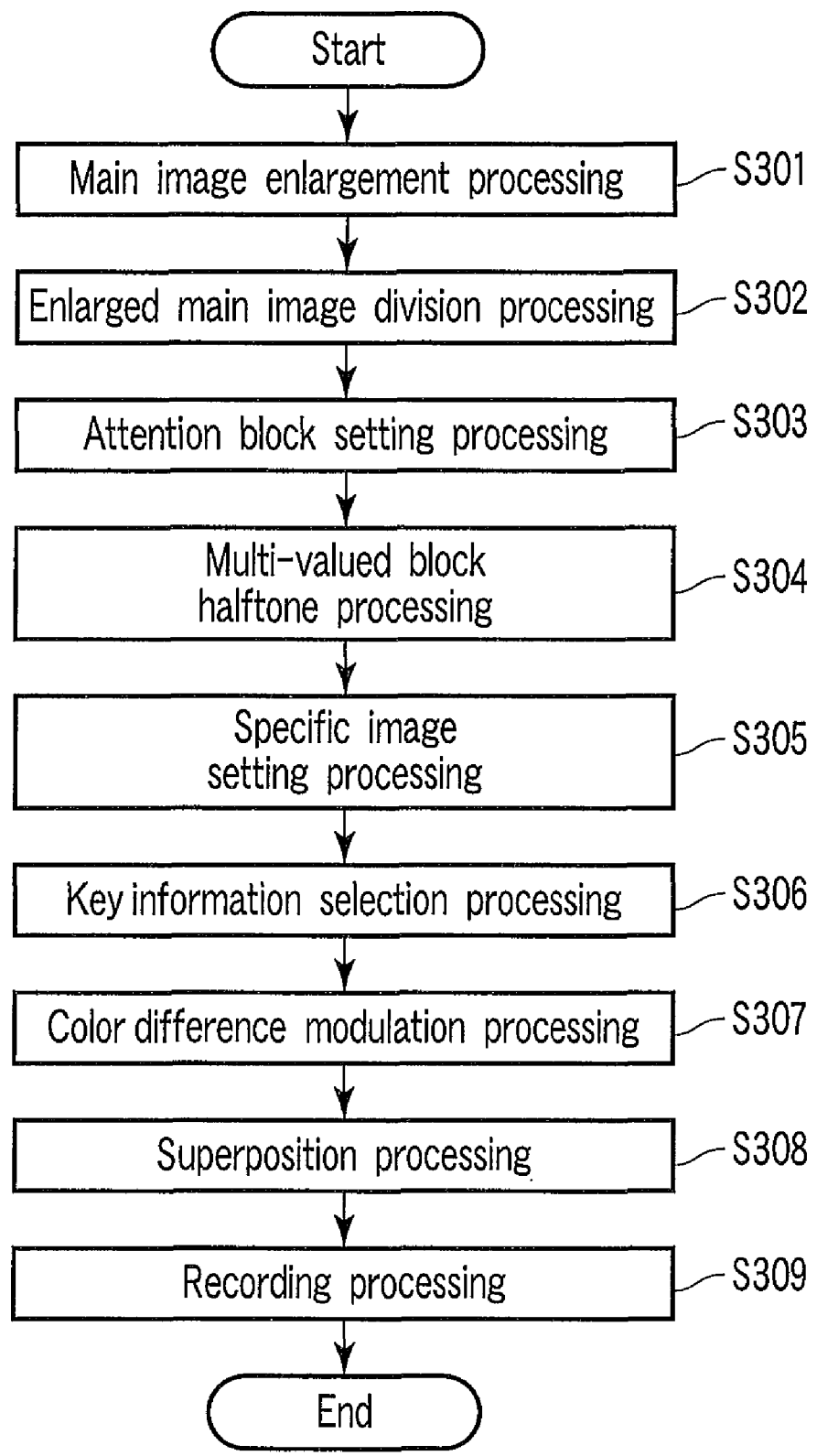
FIG. 24 is a flowchart illustrating the flow of electronic watermarking embedding processing according to the third embodiment.

FIG. 24 is a flowchart illustrating the flow of processing by the electronic watermarking embedding processing system as the third embodiment.

First, the main image enlargement part 407 inputs the main image information 401 constituted by multi-valued pixels.

After the main image information 401 is input, the main image enlargement part 407 creates enlarged main image information by enlarging the input main image information 401 in a predetermined main image enlargement ratio (step S301).

After the enlarged main image information is created, the main image division part 408 divides the enlarged main image information created by the main image enlargement part 407 into small blocks in accordance with the first key information 403 and the second key information 404 (step S302). The size of the small blocks is determined in connection with the size of key information.

After the enlarged main image information is divided into the small blocks, the attention block setting part 409 sets an attention block to each small block (step S303).

After the attention block is set to each small block by the attention block setting part 409, the multi-valued block processing part 419 makes blocks multi-valued by the block error diffusion method with the attention block as the minimum unit (step S304). That is, the multi-valued block processing part 419 performs multi-valued block error diffusion processing. As a result, all pixel values of the attention block are made multi-valued before being set to a multi-level gradation ranging from the first color (for example, white) to the second color (for example, black).

After the attention block is made multi-valued by the multi-valued block processing part 419, the specific image setting part 420 determines a specific image in accordance with the pixel value of the attention block made multi-valued (step S305). That is, the specific image setting part 420 selects the first specific image 405 or the second specific image 406, or performs processing to create a specific image in accordance with the gradation of the attention block made multi-valued.

The specific image setting part 420 selects the first specific image 405, for example, if the attention block made multi-valued by the multi-valued block processing part 419 corresponds to the first color (white), and selects the second specific image 406 if the attention block made multi-valued by the multi-valued block processing part 419 corresponds to the second color (black). Moreover, if the attention block made multi-valued by the multi-valued block processing part 419 corresponds to an intermediate color (that is, halftone), between the first color and the second color, the specific image setting part 420 creates a specific image corresponding to the gradation of the attention block. Here, if the attention block has five levels of gradation (0th to fourth levels of gradation), specific images corresponding to the first to third levels (third to fifth specific images) are created by mixing the first specific image and the second specific image in a proportion corresponding to each level.

The key information selection part 412 selects one of the predetermined first key information 403 and the second key information 404 in accordance with the sub-information 402 (step S306). For example, if the sub-information 402 is "0," the key information selection part 412 selects the first key information 403 and, if the sub-information 402 is "1," the key information selection part 412 selects the second key information 404.

After key information in accordance with the sub-information 402 is selected, the color difference modulation part 414 performs color difference modulation processing on the first key information 403 or the second key information 404 selected by the key information selection part 412 based on the predetermined color difference amount (ΔCd) 413 (step S307).

After the specific image is determined and color-difference-modulated key information is obtained, the superposition part 415 performs processing to superpose the information color-difference-modulated by the color difference modulation part 414 on the specific image selected by the specific image setting part 420 (step S308). That is, the superposition part 415 performs processing to superpose the first key information 403 or the second key information 404, for which color difference modulation processing has been performed by the color difference modulation part 414, on the attention block to which the specific image determined by the specific image setting part 420 in the main image information is assigned. Accordingly, the superposition part 415 creates the synthetic image information 416 by embedding the sub-information 402 in an invisible state in the input main image information 401.

After the synthetic image information 416 is created by the superposition part 415, the recording part 417 performs processing to record (print) the synthetic image information 416 on a recording medium (step S309). Accordingly, the recording part 417 creates the recorded matter 418 in which the synthetic image information is printed and which is used, for example, as an ID card. The recording part 417 performs processing to print the synthetic image information 416 on a recording medium in color regardless of whether the main image information 401 is a color image or binary image. This is because of the reason described in the first embodiment.

Next, creation processing of the specific image will be described.

If, as described above, a block created by the multi-valued block processing part 419 has an intermediate color, the specific image setting part 420 creates a specific image in accordance with a halftone of the block from the first specific image 405 and the second specific image 406. That is, the specific image setting part 420 creates a specific image corresponding to the block by mixing the first specific image 405 and the second specific image 406 in a proportion corresponding to the halftone of the block.

FIG. 25A shows the first specific image 405 associated when the block has the first color (for example, white). FIG. 25B shows the second specific image 406 associated when the block has the second color (for example, black). FIG. 25C is a diagram showing a state in which the first specific image 405 is divided into Sx pixels×Sy pixels (in the example shown in FIG. 25C, four pixels×four pixels). Similarly, FIG. 25G is a diagram showing a state in which the second specific image 406 is divided into Sx pixels×Sy pixels (in the example shown in FIG. 25G, four pixels×four pixels). Here, if the number of levels of gradation is five, in addition to the first and second specific images, three specific images (third to fifth specific images) are needed. For example, FIG. 25D is a diagram exemplifying the third specific image. FIG. 25E is a diagram exemplifying the fourth specific image. FIG. 25F is a diagram exemplifying the fifth specific image.

The first to fifth specific images are associated with each of the five levels of gradation (0th to fourth levels of gradation). That is, the first specific image shown in FIG. 25C is associated with the 0th level (gradation containing the maximum brightness), the second specific image shown in FIG. 25G is associated with the fourth level (gradation containing the minimum brightness), and the third to fifth specific images shown in FIGS. 25D to 25F are associated with the first to third levels respectively.

If, as shown in FIGS. 25C and 25G, the first specific image and the second specific image are divided into elements of a predetermined size, the third to fifth specific images are created by combining elements obtained by dividing the first specific image and those obtained by dividing the second specific image in a proportion in accordance with the level of gradation. For example, as shown in FIG. 25D, the third specific image corresponding to the first level of gradation is created by combining the first specific image and the second specific image in the proportion of "(12:4=) 3:1". Also, as shown in FIG. 25E, the fourth specific image corresponding to the second level of gradation is created by combining the first specific image and the second specific image in the proportion of "(8:8=) 1:1". As shown in FIG. 25F, the fifth specific image corresponding to the third level of gradation is created by combining the first specific image and the second specific image in the proportion of "(4:12=) 1:3".

In the third embodiment, as described above, sub-information in an invisible state can be embedded in multi-valued attention blocks in main image information constituted by multi-valued pixels. Also, the sub-information can be restored from synthetic image information created by the electronic watermarking embedding processing described in the third embodiment, for example, by the electronic watermarking restoration processing described in the first embodiment.

Next, the fourth embodiment will be described.

In the fourth embodiment, processing to embed sub-information in a color image will be described. For example, as one application example, processing to embed sub-information in a face image for personal authentication of an ID card as a color image can be assumed.

Figure 26:
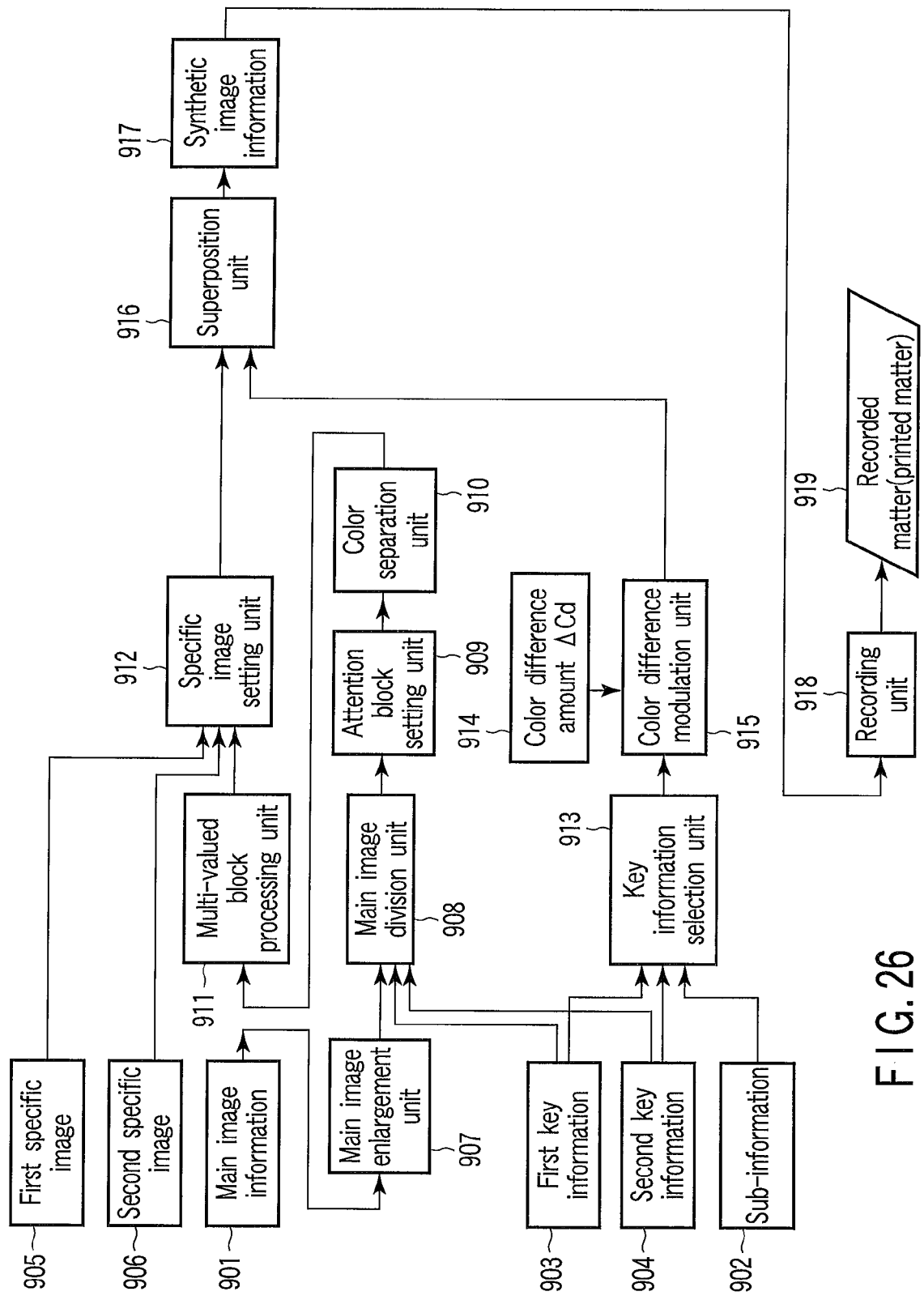
FIG. 26 is a diagram schematically showing the configuration of the electronic watermarking embedding processing system as an image processing apparatus according to a fourth embodiment.

FIG. 26 is a diagram schematically showing the configuration of the electronic watermarking embedding processing system as an image processing apparatus according to the fourth embodiment.

As shown in FIG. 26, the electronic watermarking embedding processing system according to the fourth embodiment includes a main image enlargement part 907, a main image division part 908, an attention block setting part 909, a color separation part 910, a multi-valued block processing part 911, a specific image setting part 912, a key information selection part 913, a color difference modulation part 915, a superposition part 916, and a recording part 918.

The main image enlargement part 907 is used to perform processing to input main image information 901 and processing (main image enlargement processing) to create enlarged main image information obtained by enlarging the input main image information 901. The main image enlargement part 907 performs processing to create enlarged main image information by enlarging the main image information 901 as a color image constituted by color pixels in a predetermined main image enlargement ratio.

The main image division part 908 is used to perform processing (enlarged main image division processing) to divide the enlarged main image information into small blocks. The main image division part 908 performs processing to divide the enlarged main image information obtained by the main image enlargement part 907 into small blocks in units of enlargement ratio.

The attention block setting part 909 is used to perform processing to set an attention block. The attention block setting part 909 performs processing (attention block setting processing) to set an attention block to small blocks obtained by division by the main image division part 908.

The color separation part 910 is used to perform processing (color separation processing) to color-separate a color image in the attention block. That is, the color separation part 910 color-separates a color image in the attention block set by the attention block setting part 909 into a plurality of color planes.

The multi-valued block processing part 911 performs processing to make an attention block multi-valued as the minimum unit. The multi-valued block processing part 911 performs processing (block pseudo-halftone processing) to make each of the plurality of color planes color-separated by the color separation part 910 multi-valued using the block error diffusion method with the attention block set by the attention block setting part 909 as the minimum unit.

The specific image setting part 912 is used to perform processing to set a specific image in accordance with brightness of the attention block. If the brightness of the attention block made multi-valued by the multi-valued block processing part 911 is the maximum brightness, the specific image setting part 912 assigns a first specific image 905 constituted by a plurality of pixels. If the brightness of the attention block made multi-valued by the multi-valued block processing part 911 is the minimum brightness, the specific image setting part 912 assigns a second specific image 906 constituted by a plurality of pixels that are different from those of the first specific image 905. If the brightness of the attention block made multi-valued by the multi-valued block processing part 911 is a halftone between the maximum brightness and minimum brightness, the specific image setting part 912 creates and assigns a specific image in accordance with brightness of the attention block by combining the first specific image 905 and the second specific image 906.

The key information selection part 913 is used to perform processing to select key information. The key information selection part 913 selects first key information 903 for "0 (first value)" of sub-information 902 constituted by binary information. The key information selection part 913 selects second key information 904, which is different from the first key information 903, for "1 (second value)" of the sub-information 902 constituted by binary information.

The color difference modulation part 915 is used to perform color difference modulation processing. The color difference modulation part 915 performs color difference modulation processing on the first key information 903 or the second key information 904 selected by the key information selection part 913 with a preset color difference amount 914.

The superposition part 916 is used to perform processing to create synthetic image information 917 by embedding the sub-information 902 in part of the main image information 901. The superposition part 916 performs processing (superposition processing) to superpose the first key information 903 or the second key information 904, for which color difference modulation processing has been performed by the color difference modulation part 915, on the attention block to which the first specific image 905 or the second specific image 906 is assigned by the specific image setting part 912 in the main image information 901. Accordingly, the superposition part 916 creates the synthetic image information 917 in which the sub-information 902 in an invisible state consisting of binary information is embedded in the main image information 901.

The recording part 918 is used to perform processing (recording processing) to record (print) the synthetic image information 917 created by the superposition part 916 on a recording medium in color. Accordingly, the recording part 918 creates a recorded matter 919 to be used, for example, as an ID card.

Also in the electronic watermarking embedding processing system as the fourth embodiment, information such as the main image information 901, the sub-information (electronic watermarking information) 902, the first key information 903, the second key information 904, the first specific image 905, and the second specific image 906 is handled.

The main image information 901 is assumed to be a color image constituted by color pixels. For example, the main image information 901 is a color image (color information) such as a face image for personal authentication in an ID card whose forgery or alteration should be prevented. The sub-information 902 is electronic watermarking information embedded in the main image information 901. The sub-information 902 is used to enhance security of the main image information 901.

The first key information 903 and the second key information 904 are preset information. The first key information 903 and the second key information 904 are used when the sub-information 902 is embedded in the main image information 901. Also, the first key information 903 and the second key information 904 are information serving as keys when the sub-information 902 as electronic watermarking information is restored from the recorded matter 919 such as an ID card on which synthetic image information having sub-information embedded therein is printed.

The first specific image 905 and the second specific image 906 are assumed to be information prepared in advance. The first specific image 905 and the second specific image 906 are images used in accordance with a processing result by the multi-valued block processing part 911.

Next, the flow of processing in the electronic watermarking embedding processing system as the fourth embodiment configured as described above will be described.

Figure 27:
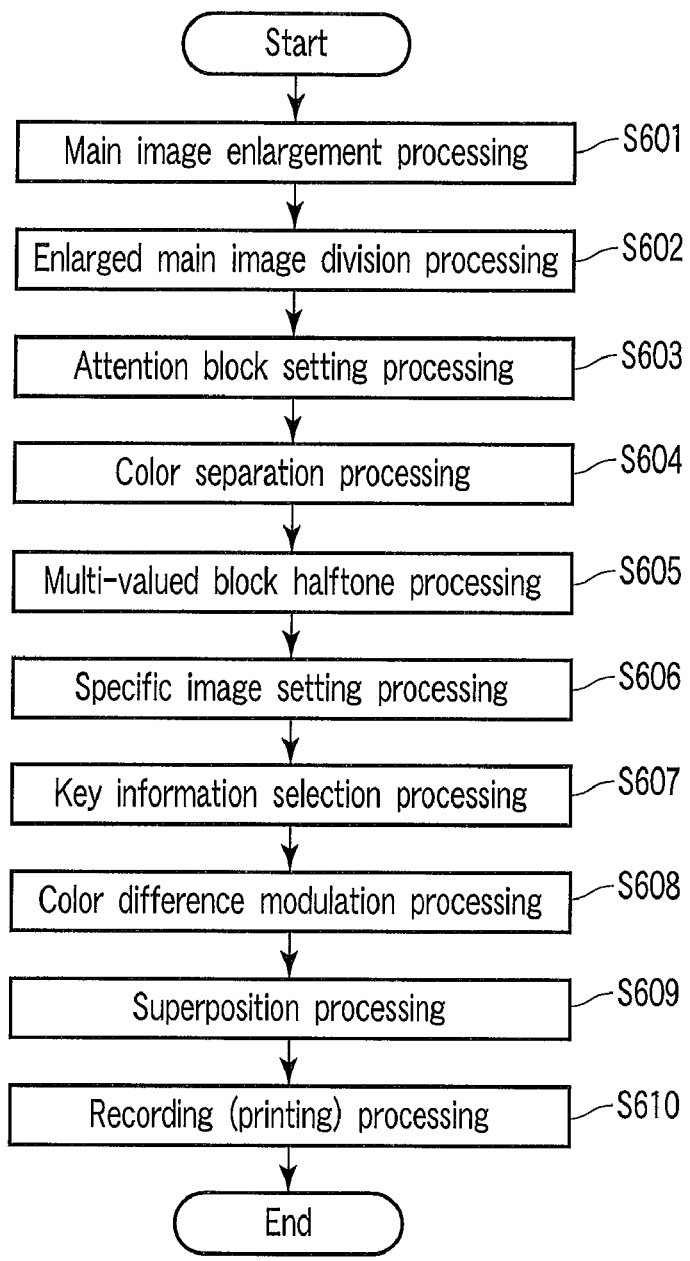
FIG. 27 is a flowchart illustrating the flow of processing in the electronic watermarking embedding processing system as the fourth embodiment.

FIG. 27 is a flowchart illustrating the flow of processing in the electronic watermarking embedding processing system as the fourth embodiment.

First, the main image enlargement part 907 inputs the main image information 901 constituted by color pixels. After the main image information 901 is input, the main image enlargement part 907 creates enlarged main image information by enlarging the input main image information 901 in a predetermined main image enlargement ratio (step S601).

After the enlarged main image information is created, the main image division part 908 divides the enlarged main image information created by the main image enlargement part 907 into small blocks in accordance with the first key information 903 and the second key information 904 (step S602). The size of the small blocks is determined in connection with the size of key information.

After the enlarged main image information is divided into the small blocks, the attention block setting part 909 sets an attention block to each small block (step S603).

After the attention block is set to each small block by the attention block setting part 909, the color separation part 910 separates a color image in the attention block into a plurality of color planes (step S604). For example, the color separation part 910 separates a color image in the attention block into color planes of three primary colors of red (R), green (G), and blue (B). Colors into which a color image is separated may be, for example, cyan (C), magenta (M), and yellow (Y). As a result of color separation processing by the color separation part 910, three color planes (for example, color planes of red, green, and blue) are output.

After a color image in the attention block is separated into the plurality of color planes, the multi-valued block processing part 911 makes each color plane of each attention block multi-valued by using the block error diffusion method with the attention block set by the attention block setting part 909 as the minimum unit (step S605). If, for example, a color image is separated into three color planes by the color separation part 910, these three color planes are made multi-valued by the block error diffusion method with the attention block as the minimum unit. Specifically, the multi-valued block processing part 911 performs the multi-valued block error diffusion processing as the multi-valued block halftone processing. As a result, all pixel values of the attention block are made multi-valued for each color and a multi-level gradation is determined. If, for example, each color of each pixel is represented as an 8-bit brightness value, the attention block has a brightness value of "0" to "255" for each color.

After each color plane of the attention block is generated, the specific image setting part 912 performs processing to determine a specific image (step S606). That is, using a processing result of the multi-valued block processing part 911, the first specific image 905, and the second specific image 906 as inputs, the specific image setting part 912 selects or creates a specific image in accordance with the brightness value in each color plane of the attention block generated by the multi-valued block processing part 911.

If, for example, the brightness value of a color plane generated by the multi-valued block processing part 911 is the maximum brightness (for example, the brightness value=255), the specific image setting part 912 selects the first specific image 905 for the color plane of the attention block. If the brightness value of a color plane generated by the multi-valued block processing part 911 is the minimum brightness (for example, the brightness value=0), the specific image setting part 912 selects the second specific image 906 for the color plane of the attention block.

If the brightness value of a color plane generated by the multi-valued block processing part 911 is a halftone between the maximum brightness and minimum brightness, the specific image setting part 912 creates a specific image corresponding to the color plane of the attention block. The specific image setting part 912 creates a specific image corresponding to the color plane, for example, by mixing the first specific image 905 and the second specific image 906 in the proportion of area in accordance with the brightness of the color plane. If the color plane is represented by 17 levels of gradation (0th to sixteenth levels of gradation), in addition to the predetermined first specific image 905 and the second specific image 906, the specific image setting part 912 creates specific images (third to seventeenth specific images) corresponding to the first to fifteenth levels of gradation.

The key information selection part 913 selects one of the first key information 903 and the second key information 904 in accordance with the sub-information 902 (step S607). For example, if the sub-information 902 is "0," the key information selection part 913 selects the first key information 903 and, if the sub-information 902 is "1," the key information selection part 913 selects the second key information 904.

After the key information in accordance with the sub-information 902 is selected, the color difference modulation part 915 performs color difference modulation processing on the first key information 903 or the second key information 904 selected by the key information selection part 913 based on the predetermined color difference amount (ΔCd) 914 (step S608).

After the specific image is selected and color-difference-modulated key information is obtained, the superposition part 916 performs processing to superpose the information color-difference-modulated by the color difference modulation part 915 on the specific image selected by the specific image setting part 912 (step S609). That is, the superposition part 916 performs processing to superpose the first key information 903 or the second key information 904, for which color difference modulation processing has been performed by the color difference modulation part 915, on a color plane of the attention block to which the first specific image 905 or the second specific image 906 determined by the specific image setting part 912 in the main image information 901 is assigned. Accordingly, the superposition part 916 creates the synthetic image information 917 by embedding the sub-information 902 in an invisible state in the input main image information 901 as a color image.

After the synthetic image information 917 is created by the superposition part 916, the recording part 918 performs processing to record (print) the synthetic image information 917 created by the superposition part 916 on a recording medium in color (step S610). Accordingly, the recording part 918 creates the recorded matter 919 in which the synthetic image information 917 is printed and which is used, for example, as an ID card. The recording part 918 performs processing to print the synthetic image information 917 on a recording medium in full color. This is because, as described later, color image processing is performed by the color difference modulation part 915.

The fourth embodiment is assumed, for example, to be applied to a face image recorded on an ID card. More specifically, the fourth embodiment is assumed to be applied to an ID card laid out as shown in FIG. 17 or 18 described in the second embodiment. However, in the fourth embodiment, sub-information is embedded in a color image. Thus, a face image in color will be recorded as the face image 602 or the face image 704.

When multi-valued block halftone processing is performed by the multi-valued block processing part 911 in the fourth embodiment, the attention block and the scanning direction of the attention block are the same as those in the second embodiment described with reference to FIGS. 19, 20 and 21. Thus, a detailed description of the multi-valued block halftone processing by the multi-valued block processing part 911 is omitted.

Also, the first key information 903 in the fourth embodiment is basically the same as the first key information shown in FIGS. 6A and 6B described in the first embodiment. The second key information 904 in the fourth embodiment is basically the same as the second key information shown in FIGS. 6C and 6D described in the first embodiment. Thus, a detailed description of the first key information 903 and the second key information 904 is omitted. However, association of the first key information 903 and the second key information 904 with the first color and the second color is relative and the colors may be interchanged. Also, assignment of the first key information 903 and the second key information 904 to "0" and "1" in the sub-information 902 is relative and key information may be interchanged.

Next, creation processing of a specific image in the fourth embodiment will be described.

Figure 28A:
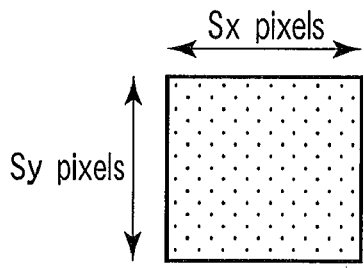
FIG. 28A shows a first specific image (specific information) associated with a maximum brightness value.
Figure 28B:
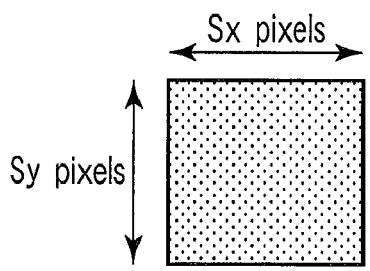
FIG. 28B shows a second specific image (specific information) associated with a minimum brightness value.

FIG. 28A shows the first specific image 905 associated with the maximum brightness value. FIG. 28B shows the second specific image 906 associated with the minimum brightness value. A shown in FIGS. 28A and 28B, it is assumed that the first specific image 905 and the second specific image 906 each have the size of Sx horizontal pixels× Sy vertical pixels. The value of brightness of the first specific image 905 shown in FIG. 28A is a value obtained by subtracting a fixed value α (maximum brightness value/2>α>0) from the maximum brightness value. The value of brightness of the second specific image 906 shown in FIG. 28B is a value obtained by adding a fixed value β (maximum brightness value/2>β>0) to the minimum brightness value=0. If, for example, the value of brightness is represented as an 8-bit value, the maximum brightness value is "255" and the minimum brightness value is "0".

Here, an example of a specific image in which the value of brightness is represented by 17 levels of gradation will be described.

FIG. 29A shows the first specific image 905 corresponding to the maximum brightness value. FIG. 29B shows the second specific image 906 corresponding to the minimum brightness value. FIGS. 29C and 29K show states in which the first specific image 905 shown in FIG. 29A and the second specific image 906 shown in FIG. 29B are divided into Sx×Sy sizes (in the examples shown in FIGS. 29C and 29K, 4×4 sizes) respectively.

Here, if the number of levels of gradation is 17, in addition to the first and second specific images, 15 specific images (third to seventeenth specific images) are needed. For example, FIG. 29D is a diagram exemplifying the third specific image corresponding to the first level of gradation. FIG. 29E is a diagram exemplifying the fourth specific image corresponding to the second level of gradation. FIG. 29F is a diagram exemplifying the fifth specific image corresponding to the third level of gradation. FIG. 29G is a diagram exemplifying the sixth specific image corresponding to the fourth level of gradation. FIG. 29H is a diagram exemplifying the seventh specific image corresponding to the fifth level of gradation. FIG. 29I is a diagram exemplifying the eighth specific image corresponding to the sixth level of gradation. FIG. 29J is a diagram exemplifying the ninth specific image corresponding to the seventh level of gradation.

The above first to seventeenth specific images are associated with each of the 17 levels of gradation (0th to sixteenth levels of gradation). That is, the first specific image shown in FIG. 29C is associated with the 0th level of gradation (the level of gradation containing the maximum brightness value), the second specific image shown in FIG. 29K is associated with the sixteenth level of gradation (the level of gradation containing the minimum brightness value), and the third to ninth specific images shown in FIGS. 29D to 29J are associated with the first to seventh levels of gradation respectively.

If, as shown in FIGS. 29C and 29K, the first specific image and second specific image are divided into elements of a predetermined size, the third to ninth specific images are created by combining elements obtained by dividing the first specific image and those obtained by dividing the second specific image in a proportion in accordance with the level of gradation.

For example, as shown in FIG. 29D, the third specific image corresponding to the first level of gradation is created by combining the first specific image and the second specific image in the proportion of "15:1". Also, as shown in FIG. 29E, the fourth specific image corresponding to the second level of gradation is created by combining the first specific image and the second specific image in the proportion of "14:2 (=7:1)". As shown in FIG. 29F, the fifth specific image corresponding to the third level of gradation is created by combining the first specific image and the second specific image in the proportion of "13:3". As shown in FIG. 29G, the sixth specific image corresponding to the fourth level of gradation is created by combining the first specific image and the second specific image in the proportion of "(12:4 (=3:1)". As shown in FIG. 29H, the seventh specific image corresponding to the fifth level of gradation is created by combining the first specific image and the second specific image in the proportion of "11:5". As shown in FIG. 29I, the eighth specific image corresponding to the sixth level of gradation is created by combining the first specific image and the second specific image in the proportion of "10:6 (=5:3)". As shown in FIG. 29J, the ninth specific image corresponding to the seventh level of gradation is created by combining the first specific image and the second specific image in the proportion of "9:7".

For other numbers of levels of gradation, various specific images corresponding to various halftones can be created based on the first specific image 905 and the second specific images 906. Therefore, the above processing is applicable to various numbers of levels of gradation.

Relations of sizes of the main image information 901, the first specific image 905, the second specific image 906, the first key information 903, the second key information 904, and the attention block in the fourth embodiment are the same as those shown in the formulas (G-1) to (G-4) described in the second embodiment. Processing by the color difference modulation part 915, the superposition part 916, and the recording part 918 according to the fourth embodiment is the same as that by the color difference modulation part 112, the superposition part 113, and the recording part 115 according to the first embodiment. Thus, a detailed description of processing by the color difference modulation part 915, the superposition part 916, and the recording part 918 is omitted.

Next, electronic watermarking restoration processing as the fourth embodiment will be described.

Figure 30:
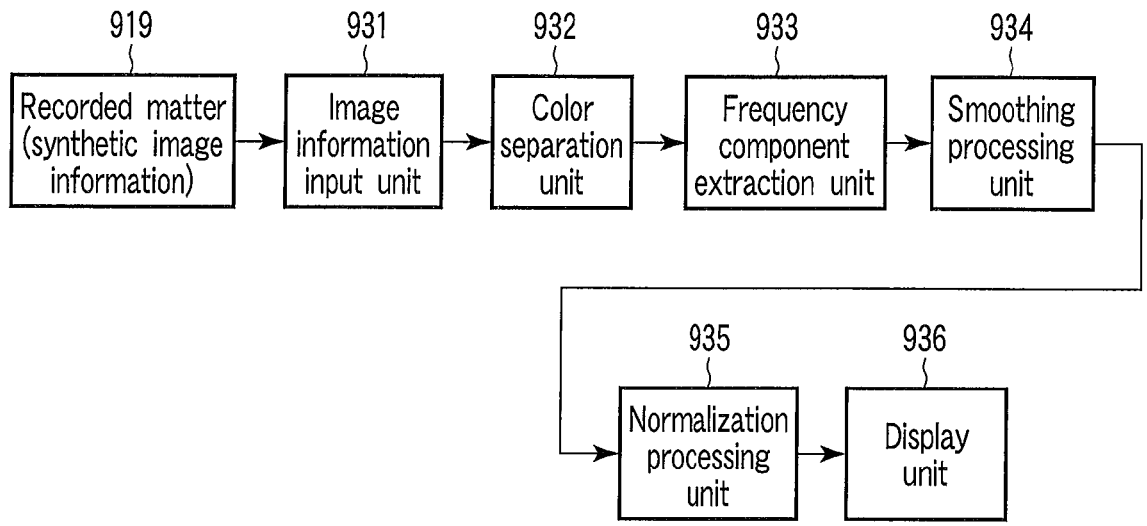
FIG. 30 is a diagram schematically showing the configuration of the electronic watermarking restoration processing system as an image processing apparatus according to the fourth embodiment.

FIG. 30 is a diagram schematically showing the configuration of the electronic watermarking restoration processing system as an image processing apparatus according to the fourth embodiment.

The electronic watermarking restoration processing system includes an image information input part 931, a color separation part 932, a frequency component extraction part 933, a smoothing processing part 934, a normalization processing part 935, and a display part 936.

The image information input part 931 is used to input image information (image information including synthetic image information) recorded in the recorded matter 919. The image information input part 931 is constituted, for example, by a scanner. In such a case, the image information input part 931 optically reads images recorded in the recorded matter 919 and converts the read image information into digital image information. The image information input part 931 may also be an interface for acquiring image information of the recorded matter 919 read by, for example, a scanner as an external device.

The color separation part 932 is used to color-separate synthetic image information input by the image information input part 931.

The frequency component extraction part 933 extracts specific frequency components from information of images in each color color-separated by the color separation part 932. Here, the specific frequency components are assumed to be frequency components of the sub-information 902.

The smoothing processing part 934 performs smoothing processing of frequency components extracted by the frequency component extraction part 933. The normalization processing part 935 performs normalization processing of processing results by the smoothing processing part 934. The display part 936 is used to display processing results by the normalization processing part 935 in a display apparatus (not shown).

Next, the flow of processing in the electronic watermarking embedding processing system as the fourth embodiment configured as described above will be described.

Figure 31:
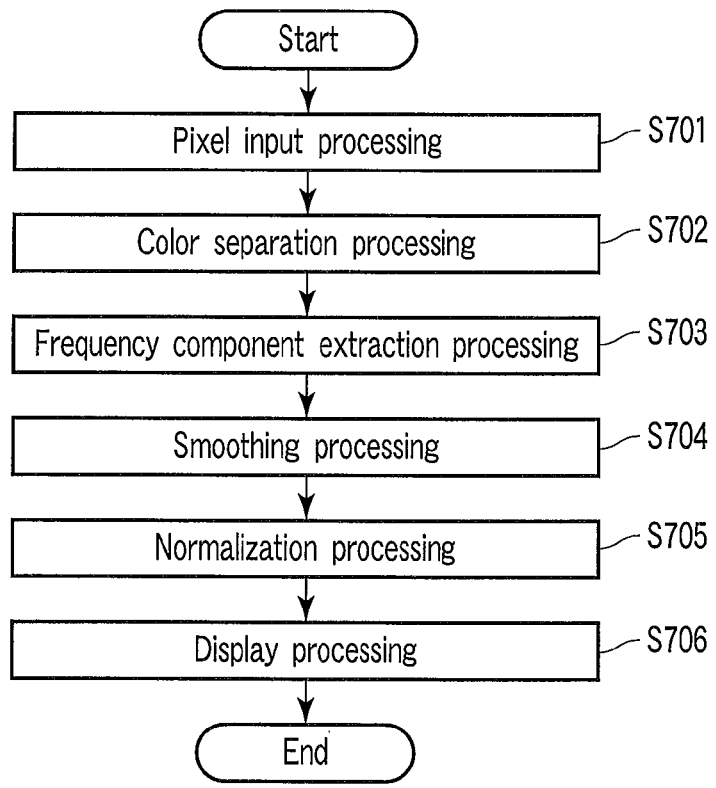
FIG. 31 is a flowchart schematically illustrating the flow of processing in the electronic watermarking restoration processing system as the fourth embodiment.

FIG. 31 is a flowchart schematically illustrating the flow of processing in the electronic watermarking restoration processing system as the fourth embodiment.

First, the image information input part 931 inputs synthetic image information recorded in the recorded matter 919 as digital image information (step S701). After image information including synthetic image information is input by the image information input part 931, the color separation part 932 separates the synthetic image information input by the image information input part 931 into a predetermined number of colors (step S702). For example, the color separation part 932 separates the synthetic image information into three primary colors of red (R), green (G), and blue (B).

After the synthetic image information is color-separated by the color separation part 932, the frequency component extraction part 933 performs processing to extract frequency components including spatial frequency components of key information from image information of each color after being color-separated (step S703). For example, the frequency component extraction part 933 performs processing to extract frequency components including spatial frequency components of, for example, the first key information 903 among a plurality of pieces of key information.

After frequency components are extracted by the frequency component extraction part 933, the smoothing processing part 934 performs processing to smooth extracted frequency components (step S704). After the frequency components are smoothed, the normalization processing part 935 performs processing on processing results by the smoothing processing part 934 so that input values are normalized to fit into the range of brightness values "0" to "255" (step S705). After frequency components extracted by the frequency component extraction part 933 are smoothed and normalized, the display part 936 displays processing results by the normalization processing part 935 (step S706).

The image information input part 931, the frequency component extraction part 933, the smoothing processing part 934, the normalization processing part 935, and the display part 936 perform processing equivalent to that performed by the image information input part 801, the frequency component extraction part 802, the smoothing processing part 803, the normalization processing part 804, and the display part 805 in the first embodiment respectively. Thus, a detailed description of processing by each of the image information input part 931, the frequency component extraction part 933, the smoothing processing part 934, the normalization processing part 935, and the display part 936 is omitted.

As restoration processing to restore sub-information from synthetic image information in which the sub-information is embedded by the processing in the above fourth embodiment, the restoration method of sub-information using a mask sheet for restoration described in the first embodiment can also be used. That is, the mask sheet for restoration is a sheet for making the sub-information 902 in the synthetic image information 917 recorded in the recorded matter 919 visible to naked eyes. The mask sheet for restoration is created by recording image information, in which a black pixel of key information used by a bit plane of sub-information to be restored is set as recording information and a white pixel as non-recording information, on a transparent recording medium in recording resolution equal to that of the synthetic image information 917 in the recording part 918. Such a mask sheet for restoration is physically superimposed on the recorded matter 919 in which the synthetic image information 917 is recorded. The sub-information 902, which is electronic watermarking, is thereby made visible (restored) in the synthetic image information 917 recorded in the recorded matter 919.

Such a restoration processing method focuses on the fact that key information is converted into color difference amounts of complementary color combinations by color difference modulation processing to create apparent achromatic information. In the mask sheet for restoration, a black pixel is recorded at a position corresponding to a pixel of the first color in synthetic image information and a position corresponding to a pixel of the second color is not recorded. Thus, if the mask sheet for restoration is correctly superimposed on the synthetic image information 917, a pixel of the first color is blocked by black and a pixel of the second color is transparent (non-recording pixel) and passed through. That is, if the mask sheet for restoration is correctly superimposed on the synthetic image information 917, one of the first and second colors in complementary color relation becomes visible and the other color is blocked and invisible. Because the color balance of color difference deteriorates down in this state, a portion where sub-information is embedded is not visually recognized as achromatic and thus becomes visible.

In the fourth embodiment, as described above, the sub-information 902 in an invisible state can be embedded in a print image, for which pseudo-halftone processing has been performed, also for the main image information 901 constituted by full color information.

Also, sub-information can be restored by electronic watermarking restoration processing as the fourth embodiment from synthetic image information created by the electronic watermarking embedding processing described in the fourth embodiment.

As has been described above in detail, according to each of the above embodiments, processing described below can be achieved:

(1) Sub-information (electronic watermarking information) in an invisible state can be embedded in an image constituted by binary pixels (for example, black and white binary image) such as a document image.

(2) Sub-information (electronic watermarking information) in an invisible state can also be embedded in an image recorded by a recording method (for example, an ink jet printer) using pseudo-halftone processing such as error diffusion processing.

(3) Sub-information can reliably be extracted from the image in which electronic watermarking is embedded, of (1) and (2).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method of creating synthetic image information in which sub-information is embedded in main image information, comprising:
    assigning specific information in accordance with a level of gradation of an attention area in the main image information to the attention area;
    performing color difference modulation processing of key information selected in accordance with a value of the sub-information based on a predetermined color difference amount;
    setting the attention area in the main image information;
    selecting, for the sub-information constituted by a first value or a second value, first key information for the first value and second key information for the second value, the second key information being different from the first key information; and
    superposing the key information, for which the color difference modulation processing has been performed, on an area to which the specific information in the main image information is assigned.

2. The image processing method according to claim 1, further comprising:
    generating a specific pixel block in which one of a first specific pixel as first specific information and a second specific pixel as second specific information is assigned to each pixel of the pixel block having a size identical to that of the key information in the main image information constituted by binary pixels with a pixel value of the first value or the second value, wherein
    assigning specific information to the attention area is to assign the first specific pixel when the attention pixel has the first value and to assign the second specific pixel when the attention pixel has the second value, and
    superposing is to superpose the key information, for which the color difference modulation processing has been performed, on the specific pixel block to which the first specific pixel or the second specific pixel is assigned in the main image information.

3. The image processing method according to claim 1, further comprising:
    creating enlarged main image information obtained by enlarging the main image information constituted by pixels having multi-valued pixel values in a predetermined enlargement ratio;
    dividing the enlarged main image information into small blocks;
    setting the attention block to the divided small blocks; and
    binarizing the attention block by a block error diffusion method to one of a first value and a second value, wherein
    assigning specific information to the attention area is to assign a first specific image as the first specific information when the binarized attention pixel has the first value and to assign a second specific image as the second specific information when the binarized attention pixel has the second value, and
    superposing is to superpose,the key information, for which the color difference modulation processing has been performed, on the block to which the first specific image or the second specific image is assigned in the main image information.

4. The image processing method according to claim 1, further comprising:
    creating enlarged main image information obtained by enlarging the main image information constituted by pixels having multi-valued pixel values in a predetermined enlargement ratio;
    dividing the enlarged main image information into small blocks;
    setting the attention block to the divided small blocks; and
    making the attention block multi-valued by a block error diffusion method, wherein
    assigning specific information to the attention area is to assign a specific image as the specific information corresponding to a level of gradation of the multi-valued attention block, and
    superposing is to superpose the key information, for which the color difference modulation processing has been performed, on the block to which the specific image is assigned in the main image information.

5. The image processing method according to claim 1, further comprising:
    creating enlarged main image information obtained by enlarging the main image information constituted by pixels having color information in a predetermined enlargement ratio;

dividing the enlarged main image information into small blocks;

setting the attention block to the divided small blocks;

color-separating a color of the attention block into color planes of each constituent color; and making the color plane of each color multi-valued by a block error diffusion method, wherein assigning specific information to the attention area is to assign a specific image as the specific information corresponding to a level of gradation to the multi-valued color plane of each color, and superposing is to superpose the key information, for which the color difference modulation processing has been performed, on the block to which the specific image is assigned in the main image information.

6. The image processing method according to claim 4, wherein the specific image as the specific information is one of a predetermined first specific image assigned to a maximum level of gradation, a predetermined second specific image assigned to a minimum level of gradation, and a specific image assigned to a halftone combining the first specific image and the second specific image in a proportion in accordance with the level of gradation.

7. The image processing method according to claim 5, further comprising:

inputting image information to be inspected recorded on a recording medium;

color-separating the image information to be inspected;

extracting frequency components from the image information of each of the color-separated colors; and performing processing to detect frequency components as the key information from the extracted frequency components.

8. The image processing method according to claim 1, wherein the specific information includes the first specific information and the second specific information, the first specific information is information obtained by subtracting a predetermined subtraction value, which is smaller than half a maximum brightness value and larger than "0", and the second specific information is information obtained by adding a predetermined addition value, which is smaller than half the maximum brightness value and larger than "0".

9. The image processing method according to claim 8, wherein the color difference amount is a value equal to or smaller than the subtraction value and the addition value, and larger than "0".

10. An image processing apparatus for creating synthetic image information in which sub-information in an invisible state is embedded in main image information, comprising:

an attention area setting part which sets an attention area in the main image information;

a specific information selection part which assigns specific information in accordance with a value of the attention area set by the attention area setting part to the attention area;

a key information selection part which selects, for the sub-information constituted by a first value or a second value, first key information for the first value and second key information for the second value;

a color difference modulation part which performs color difference modulation processing on the key information selected by the key information selection part based on a predetermined color difference, amount; and a superposition part which superposes the key information, for which the color difference modulation processing has been performed, on an area to which the specific information in the main image information is assigned.

11. The image processing apparatus according to claim 10, further comprising:

an enlargement part which creates enlarged main image information obtained by enlarging the main image information constituted by pixels having multi-valued pixel values in a predetermined enlargement ratio;

a division part which divides the main image information enlarged by the enlargement part into small blocks; and a binarization part which binarizes a specific block by a block error diffusion method to one of the first value and the second value, wherein the attention area setting part sets an attention block to the small blocks divided by the division part, the specific information selection part assigns a first specific image as the first specific information when the attention block binarized by the binarization part has the first value and to assign a second specific image as the second specific information when the attention block binarized by the binarization part has the second value, and the superposition part superposes the key information, for which the color difference modulation processing has been performed, on the block to which the first specific image or the second specific image is assigned in the main image information.

12. The image processing apparatus according to claim 10, further comprising:

an enlargement part which enlarges the main image information constituted by pixels having multi-valued pixel values in a predetermined enlargement ratio;

a division part which divides the main image information enlarged by the enlargement part into small blocks; and a multi-valuation part which makes a specific block multi-valued by a block error diffusion method, wherein the attention area setting part sets an attention block to the small blocks divided by the division part, the specific information selection part assigns a specific image as the specific information corresponding to a level of gradation of the attention block made multi-valued by the multi-valuation part, and the superposition part superposes the key information, for which the color difference modulation processing has been performed, on the block to which the specific image is assigned in the main image information.

13. The image processing apparatus according to claim 10, further comprising:

an enlargement part which enlarges the main image information constituted by pixels having color information in a predetermined enlargement ratio;

a division part which divides the main image information enlarged by the enlargement part into small blocks;

a color separation part which color-separates a color in a specific block into color planes of each constituent color; and a multi-valuation part which makes the color plane of each color created by the color separation part multi-valued by a block error diffusion method, wherein the attention area setting part sets an attention block to the small blocks divided by the division part, the specific information selection part assigns a specific image as the specific information corresponding to a level of gradation of the color plane of each color made multi-valued by the multi-valuation part, and the superposition part superposes the key information, for which the color difference modulation processing has been performed, on the block to which the specific image is assigned in the main image information.

14. The image processing apparatus according to claim 10, further comprising:
- an image input part which inputs, image information to be inspected recorded on a recording medium;
- a frequency component extraction part which extracts frequency components from the image information to be inspected; and
- a processing part which performs processing to detect frequency components as the key information from the frequency components extracted by the frequency component extraction part.

15. The image processing apparatus according to claim 13, further comprising:
- an image input part which inputs image information to be inspected recorded on a recording medium;
- the color separation part which color-separates the image information to be inspected acquired from the image input part;
- a frequency component extraction part which extracts frequency components from the image information of each color color-separated by the color separation part; and
- a processing part which detects frequency components as the key information from the frequency components extracted by the frequency component extraction part.

* * * * *